United States Patent [19]

Davies

[11] Patent Number: 4,693,773

[45] Date of Patent: Sep. 15, 1987

[54] METHODS FOR FORMING VISIBLE FILE POCKETS

[75] Inventor: Alan F. Davies, Vancouver, Canada

[73] Assignee: Davies Office Equipment, Ltd., Vancouver, Canada

[21] Appl. No.: 701,113

[22] Filed: Feb. 13, 1985

Related U.S. Application Data

[62] Division of Ser. No. 461,537, Jan. 27, 1983.

[51] Int. Cl.[4] .......................... B29C 53/00; B31F 1/00
[52] U.S. Cl. .................................... 156/200; 156/201; 156/227; 156/461; 264/285; 264/339
[58] Field of Search ............... 156/201, 222, 217, 200, 156/290, 254, 308.4, 226, 227, 467, 499, 463, 443, 537; 264/522, 259, 285, 322, 339; 40/311, 324, 201, 228

[56] References Cited

U.S. PATENT DOCUMENTS

| | | | |
|---|---|---|---|
| 1,890,182 | 12/1932 | Hunter | 40/535 |
| 2,758,624 | 8/1956 | Krause et al. | 156/227 |
| 3,012,603 | 12/1961 | Newsome et al. | 156/200 |
| 3,518,145 | 6/1970 | Christensen | 156/254 |
| 3,579,396 | 5/1971 | Washburn et al. | 156/461 |
| 3,654,013 | 4/1972 | Willsie et al. | 156/204 |
| 3,767,752 | 10/1973 | Karlyn | 264/339 |
| 3,956,045 | 5/1976 | Hoffman | 156/227 |
| 4,151,031 | 4/1979 | Goad et al. | 156/324 |
| 4,196,565 | 4/1980 | Hirschman | 156/227 |
| 4,259,141 | 3/1981 | Andersson et al. | 156/463 |
| 4,508,582 | 4/1985 | Fink | 156/227 |

FOREIGN PATENT DOCUMENTS

| | | | |
|---|---|---|---|
| 1938750 | 2/1971 | Fed. Rep. of Germany | 40/405 |
| 929587 | 12/1947 | France . | |
| 576269 | 4/1958 | Italy | 40/535 |
| 155919 | 12/1982 | Japan | 156/227 |

*Primary Examiner*—Donald E. Czaja
*Assistant Examiner*—Louis Falasco
*Attorney, Agent, or Firm*—Hughes & Cassidy

[57] ABSTRACT

A visible file pocket (100) having a laminar central web (101) and front and back, lower and upper pocket tips (102–105) for receiving the lower and upper edges of documents to be supported thereon and wherein the upper edge (108) of the file pocket (100) is provided with a transversely extending hinge pin receiving bore (109) adapted to receive a hinge pin (110) and laterally projecting hinge elements (112). Methods and apparatus (140) for forming such file pockets (100) from two continuous sheets (114U, 114L) of coated polymeric materials are provided having a laminating station (150), a cooling station (170), a series of edge forming stations (180, 200, 220, 230), and a web subdividing station (270) wherein: (i) the two continuous sheets of coated polymeric materials (114U, 114L) are passed through the laminating station (150) and cooling station (170) with their heat-bondable surfaces in face-to-face relation and are bonded together to form a continuous central laminated web (101) having left and right unlaminated, unbonded, longitudinally extending edges (101A), 101B); (ii) the unlaminated plies defining the left and right edges (101A, 101B) are spread apart, heated, and folded in opposite directions to form left and right T-shaped edges (181L, 181R) in a first edge forming station (180); (iii) left and right coated polymeric ribbons (201L, 201R) are bonded to the left and right T-shaped edges (181L, 181R) while forming left and right longitudinally extending gaps (204L, 204R) between the ribbons and T-shaped edges in a second edge forming station (200); (iv) the bonded left and right ribbons (201L, 201R) and T-shaped edges (181L, 181R) are folded over in the third edge forming station (220) by means of left and right grooved rollers (221, 222), (v) the folded over left and right edges are heated by means of C-shaped heaters (231, 260) while air is expressed from the left gap (204L) so as to eliminate such gap; (vi) the left and right folded over edges are passed through left and right profile control assemblies (234, 265) where they are shaped, cooled and set; and (vii), the thus formed continuous web (101) is passed through a web subdividing station (270) wherein it is cut into discrete lengths forming file pockets (100). Various modified file pocket configurations (300, 310, 310', 330, 340, 381, 400) are disclosed.

28 Claims, 57 Drawing Figures

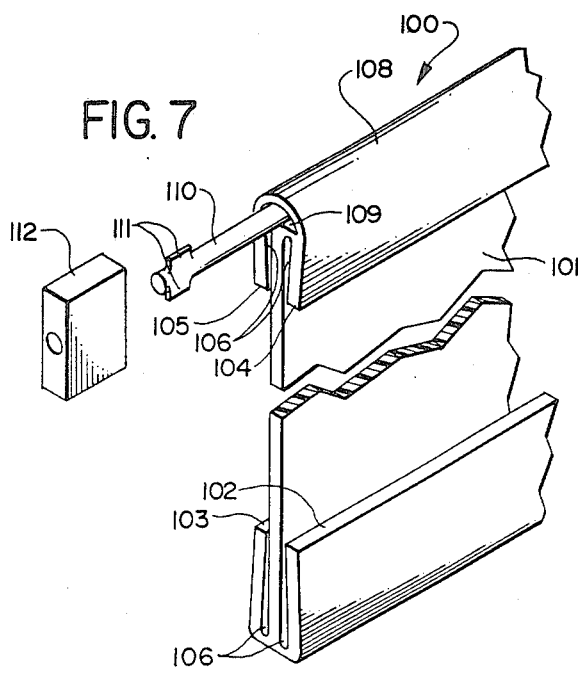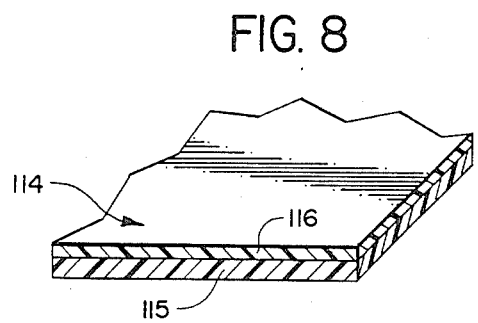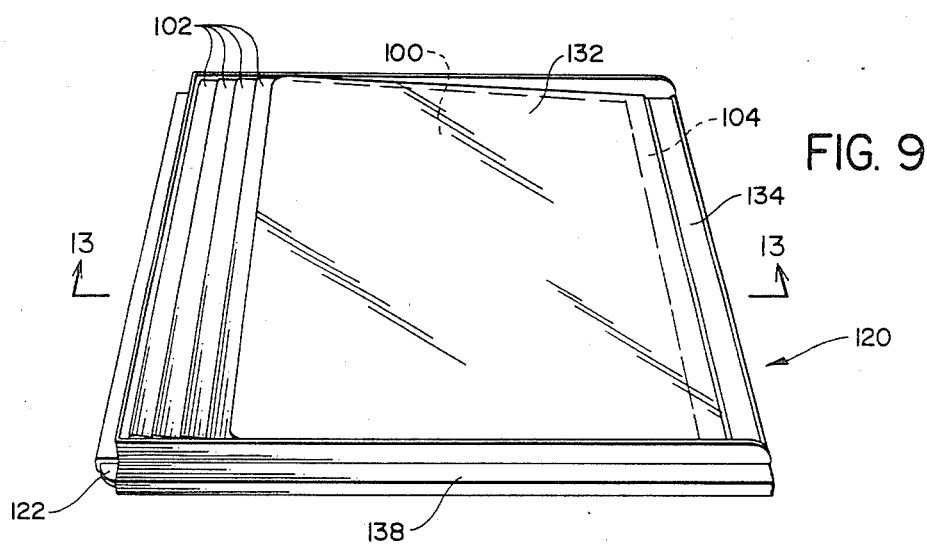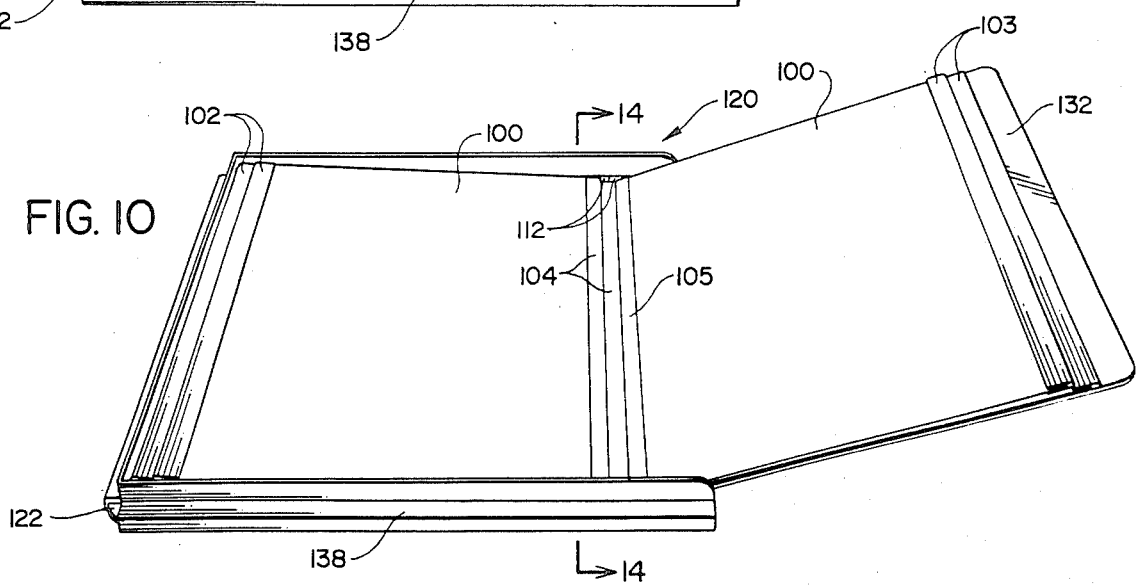

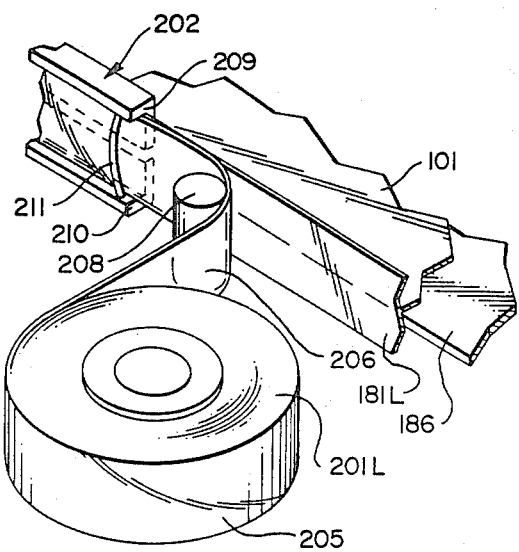
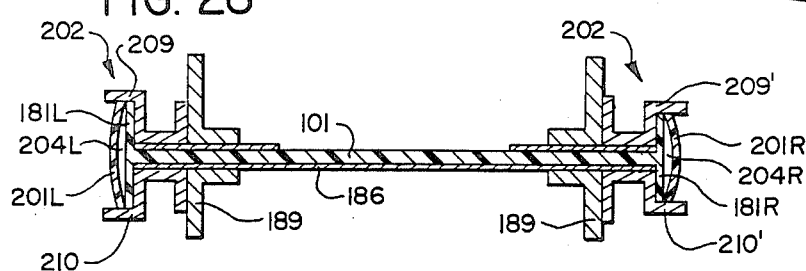
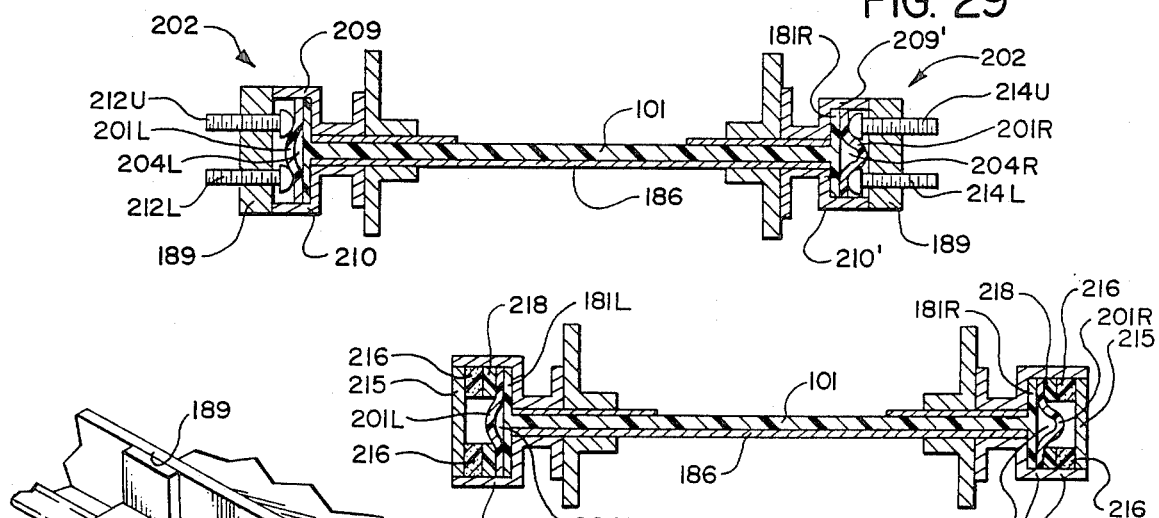
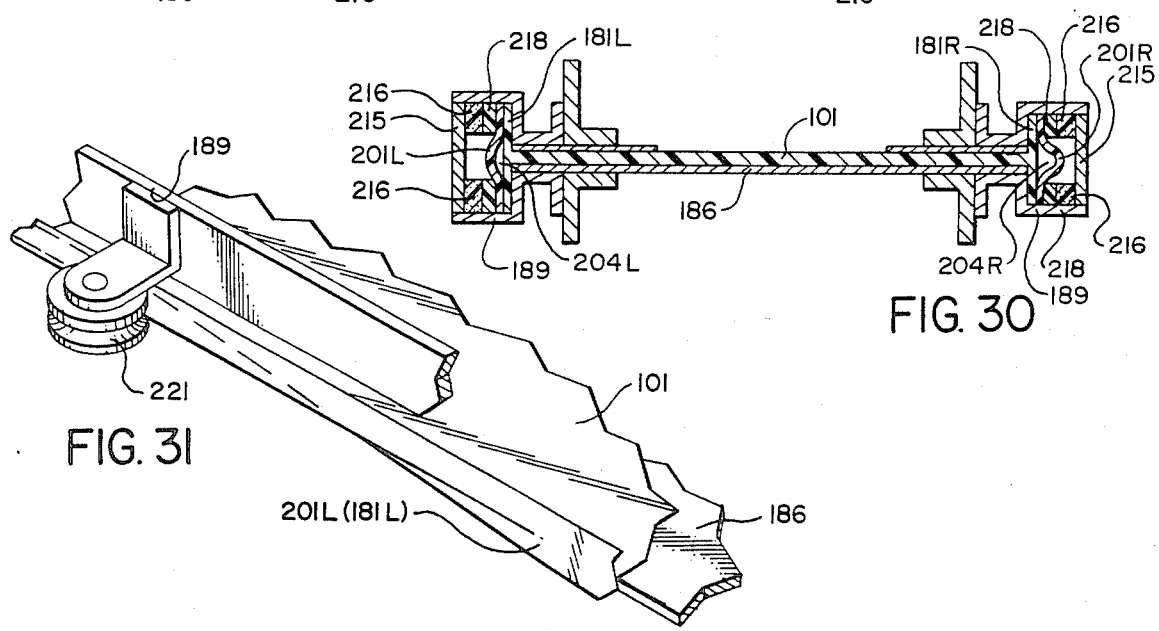

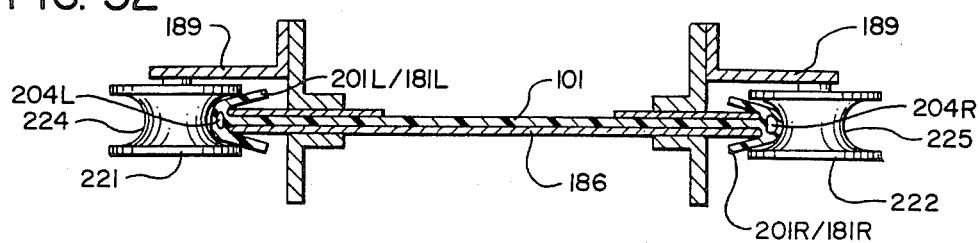
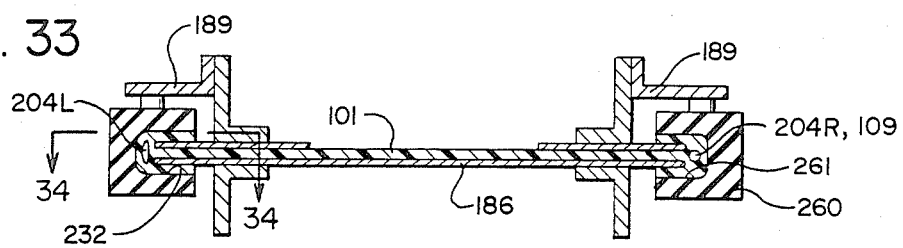
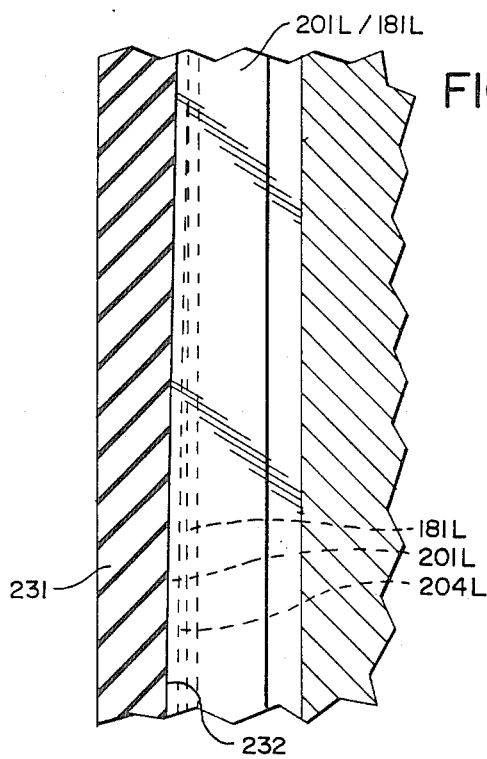
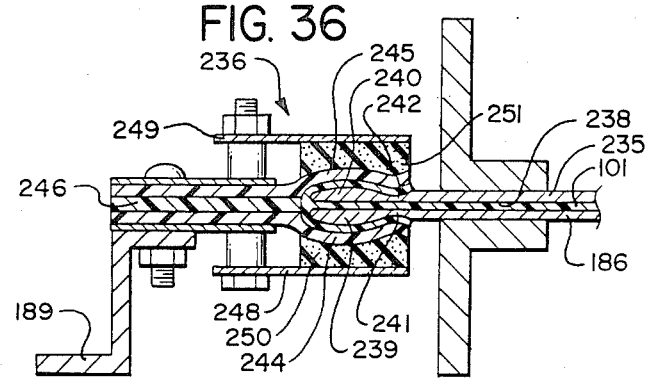
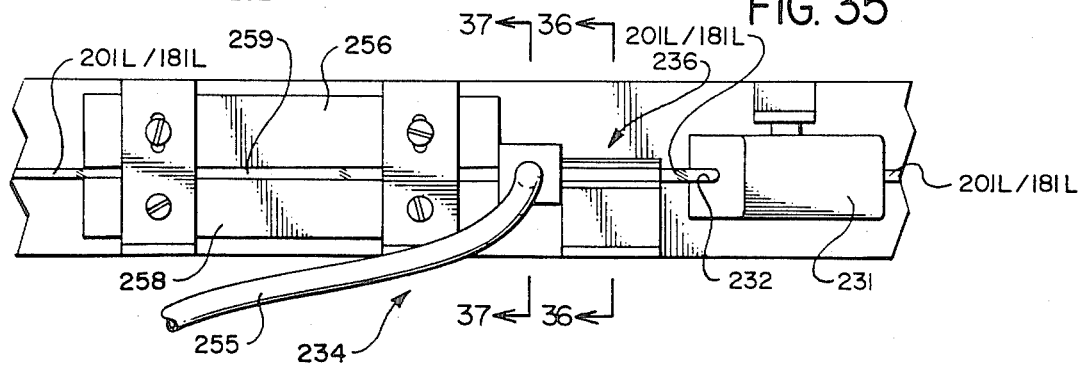

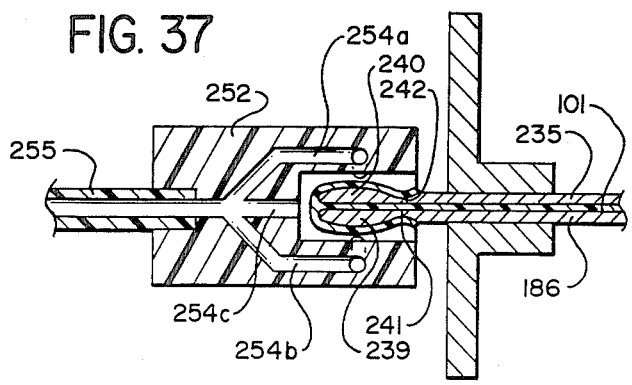
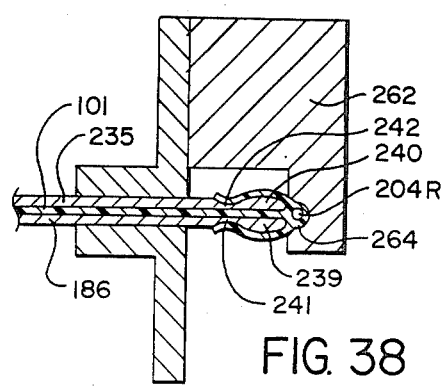
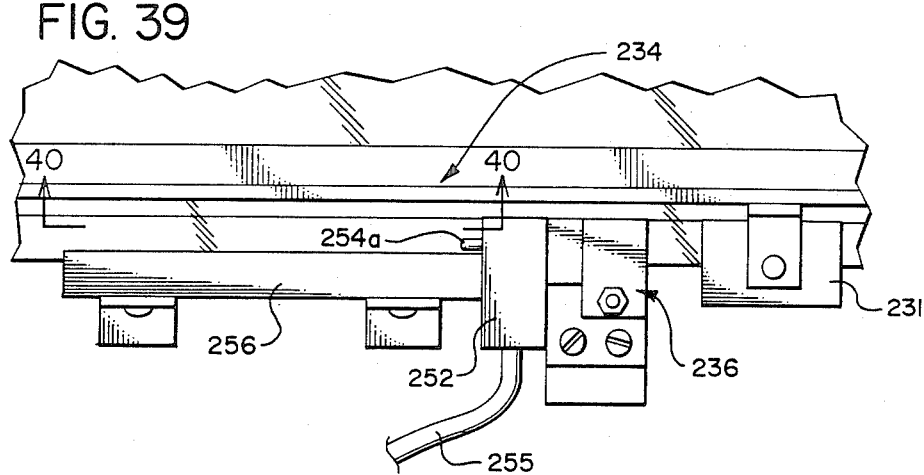
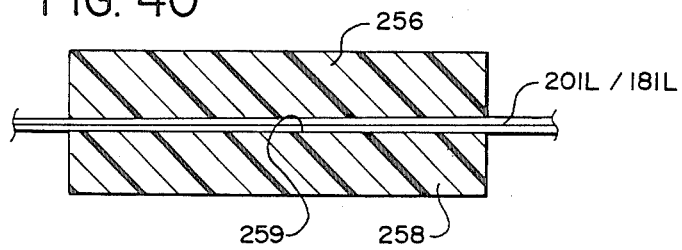

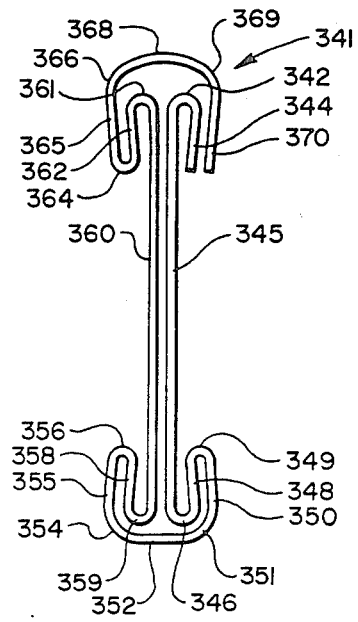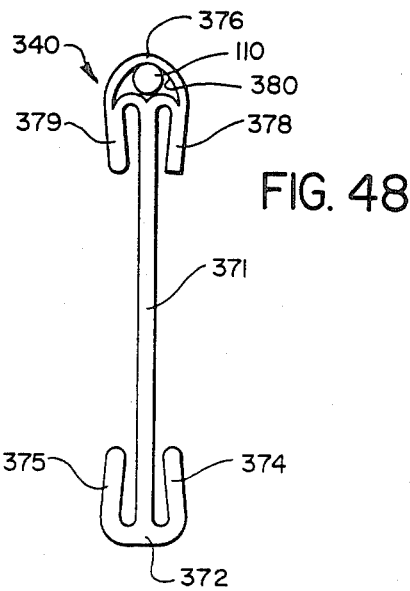
FIG. 48
FIG. 47
FIG. 50
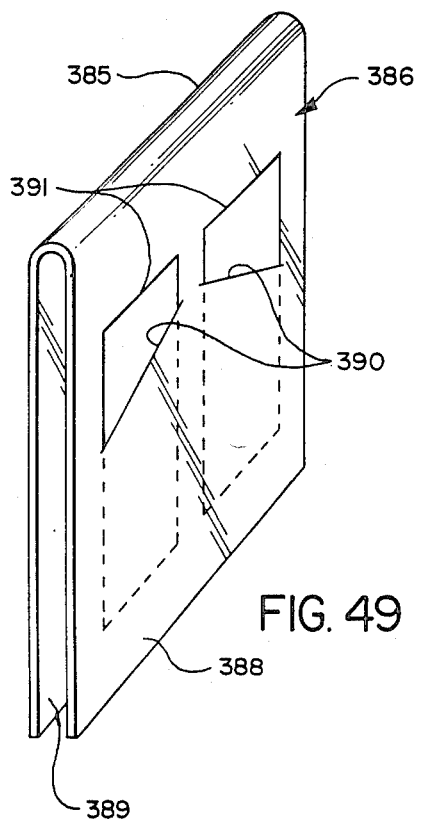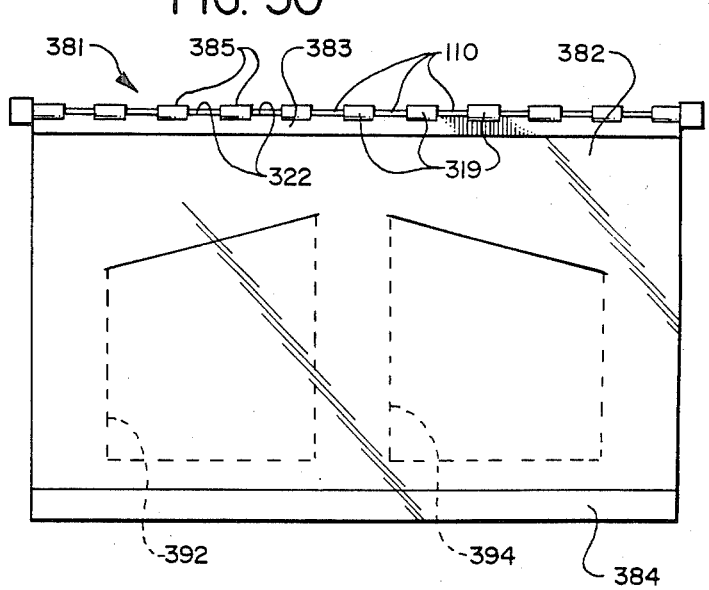
FIG. 49

METHODS FOR FORMING VISIBLE FILE POCKETS

This is a division of application Ser. No. 461,537, filed Jan. 27, 1983.

RELATED APPLICATIONS

Alan F. Davies, U.S. application Ser. No. 461,538, filed Jan. 27, 1983, now U.S. Pat. No. 4,551,934 for "Visible File Pocket Support Panel".

Alan F. Davies, U.S. application Ser. No. 698,074, filed Feb. 4, 1985, for "VISIBLE FILE POCKET SUPPORT PANEL AND METHOD OF FABRICATING SAME", a divisional application based on the aforesaid application Ser. No. 461,538.

Alan F. Davies, U.S. application Ser. No. 701,114, filed Feb. 13, 1985, now U.S. Pat. No. 4,584,051, for "Apparatus For Forming Visible File Pockets", a divisional application based on the aforesaid application Ser. No. 561,537 and of which this application is also a divisional.

BACKGROUND OF THE INVENTION

1. Technical Field

The present invention relates generally to record keeping filing systems; and, more particularly, to methods for forming improved visible file pockets of the type adapted to receive, support and display a wide variety of documents and/or business records—for example, patient records of the type maintained at hospitals, clinics, medical offices and similar health care provisioners; inventory control records at manufacturing, distribution and/or retail facilities; and the like—with such file pockets characterized by their ability to receive, support and display such records on both faces of each different file pocket. The visible file pockets made in accordance with the present invention are further of the type which permit a plurality of such pockets to be individually and easily inserted into and/or removed from a support tray or panel of the type more fully disclosed and claimed in the aforesaid related copending application, Ser. No. 461,538, filed Jan. 27, 1983, now U.S. Pat. No. 4,551,934, for pivotal movement about individual hinge axes disposed along one edge of each file pocket and wherein the plurality of file pockets are carried by such support panel in overlapping relation for continuously displaying at least that portion of each file pocket containing file identifying indicia so as to enable any specific file pocket of interest to be located at a glance and permitting all overlapping file pockets to be simultaneously pivoted about their respective hinge axes to expose the particular file pocket of interest and the document(s) stored therein.

2. Background Art

During the past several decades, many different types of record keeping systems have been devised and specifically tailored for the particular industry involved and/or the type(s) of file data being recorded and/or maintained. In some instances, the data card(s), hereinafter generically referred to as "document(s)", are intended for inventory management or control; and, in other instances, the documents commonly comprise patient records or the like maintained by such health care provisioners as hospitals, clinics, medical offices, and the like; to name but a few of the different industrial and/or business environments where such records are maintained. However, despite the specific nature and content of the business document itself and/or the particular industry/business environment involved, one problem that has commonly been encountered has involved record keeping systems wherein the particular business documents involved can be safely stored in such a manner that: (i) each document is readily accessible so that authorized personnel having custody thereof and/or access thereto can review the same and/or make suitable entries thereon, all on a periodic and ofttime frequent basis—e.g., in a hospital it is often necessary to record a patient's vital signs on a shift, hourly, or even more frequent, basis; (ii) each document may be conveniently inserted into, removed from, and/or replaced in its applicable file pocket; (iii) each document is confined and protected such that it is not likely to be lost or misplaced; (iv) all documents can be compactly stored in a minimum amount of storage space; (v) equally sized documents can be mounted on the front and back faces of each file pocket; and (vi), perhaps of most importance, identifying indicia for each different document file pocket is visibly exposed at all times so that a specific document and/or category of documents can be located at a glance and easily retrieved or exposed when, for example, an interested party wishes to review and/or update a particular document (such as a given patient record in the case of a health care provisioner). Thus, despite the wide differences in the types of documentary data maintained, in virtually all cases there have been many common requirements and/or desideratum in terms of document storage, access and/or retrieval.

Generally, such requirements and/or desideratum have been satisfied (to the extent possible) by providing individual file pockets formed from a wide range of materials and capable of storing and displaying one or more documents on each face of the file pocket; and, by providing each file pocket with hinge means disposed along one edge of the pocket whereby the pocket and whatever document(s) is (are) carried thereon can be removably and pivotally mounted in a generally flat document tray in staggered, partly overlapping, relation such that the bottom edges of all file pockets are fully exposed and available for the application of appropriate file identifying indicia, thereby enabling any particular file of interest to be located at a glance and all superimposed file pockets pivoted upwardly and backwardly about their hinged connections to the tray so as to fully expose the file pocket and stored document(s) of interest. Those skilled in the art will, of course, appreciate that the term "file pocket" as used herein is intended to mean a generally rectangular sheet-like support element normally having a hinge element formed along and/or attached to one horizontal edge and means for captively retaining one or more documents on at least one face, and generally both faces, of the rectangular sheet-like support element. The particular means for captively retaining documents have varied widely; but, one common practice has been to employ some means defining a pocket tip along one horizontal edge of the support element and on both the front and back faces thereof wherein the pocket tip cooperates with the support element to form front and/or back horizontally extending cavities adapted to receive and compressibly or yieldably retain the particular document(s) of interest.

One of the more popular conventional file pockets which has been extensively used for many years comprises a main support element generally formed from paper, paperboard, or a thin sheet of plastic such, for example, as celluloid. Commonly, an upper stiffening member, which also serves as a hinge, is stapled or otherwise affixed to one edge of the support element with the stiffening member projecting laterally beyond the side edges of the support element to permit the file pocket to be hingedly mounted in a tray. A second stiffening member, generally in the form of a U-shaped pocket tip-defining element commonly formed of celluloid or the like, is typically mounted in surrounding relation to the opposite or lower edge of the support element and retained in place by means of staples or the like. Commonly, the support element itself is provided with a plurality of generally parallel die cut diagonal slots disposed in a rectilinear pattern to permit the corners of file documents to be inserted through such slots so as to permit captive retention of at least one edge of the document on the support element. That is, a given document will commonly have one edge inserted into the pocket tip-defining means along one edge of the support element with the two corners of the document remote from that edge then being inserted into the appropriate diagonal die cut slots formed in the support element. A plurality of such file pockets have conventionally been hingedly mounted in suitable document tray.

While the foregoing approach has provided a very convenient and popular way to maintain file documents, certain drawbacks have nonetheless been encountered. Thus, a significant problem resides in the conventional use of paper or paperboard as a principal construction material for the support element itself. In such cases, repeated use of the file pocket causes frequent need to replace such pockets due to failure of the support element, particularly at or near the weakened hinge line. The use of staples and similar separate fasteners to secure the components together into a file pocket assembly invariably necessitates die cutting the documents themselves to provide a slot therein so that the edges of documents can bridge the locations of the staples. The use of an array of diagonal slots to receive corners of documents produces numerous weakened areas in the main body of the support element which are subject to tearing and fatigue damage; and, in the case of smaller documents, precludes support of two identically sized documents on both faces thereof since the first document disposed within a given series of diagonal slots obstructs the same and prevents use of the same slots for retention of documents on the opposite face. Nevertheless, despite the foregoing disadvantages, such composite paperboard/plastic file pockets have, prior to the advent of the present invention, continued to be the most commonly accepted form of visible document storage/retrieval system used in industry and/or business today notwithstanding numerous efforts that have been made to modify that approach.

One such attempt to provide an improved file pocket has involved the use of a sheet-like plastic support element which has its lower edge turned upwardly upon itself to form a pocket tip on the front face of the support element; and, wherein the main support element is provided with two or more inverted U-shaped slits in the region thereof underlying the upturned pocket tip so as to define tabs therein which can be projected out of the plane of the support element in a direction opposite to the upturned pocket tip so as to define a second discontinuous pocket tip on the opposite or rear face of the support element. While this approach generally avoids the disadvantages inherent with the former type of file pocket resulting from the use of staples and similar fastening elements, many disadvantages are still presented. Thus, the upturned pocket tip formed on one side of the support element and the discontinuous pocket tip formed on the opposite side of the support element are not symmetrical and, therefore, tend to preclude receipt and storage of identically sized documents on both sides of the support element. Dependent upon the position and configuration of the slits and folds employed to form the discontinuous pocket tip, individual file documents often still require die cuts in the regions of pocket tip discontinuity. Moreover, this type of file pocket has not satisfactorily resolved the need for a particular pocket tip configuration which compressibly and yieldably retains documents captive therein.

Accordingly, the need continues to exist: (i) for methods for forming an improved file pocket construction which is capable of accommodating identically sized documents on each face of the file pocket and wherein one or more of such documents are firmly and positively retained, compressibly and yieldably, in captive relationship within the pocket tips so as to prevent accidental dislodgement of documents and consequent loss and/or damage thereto; and (ii), for a file pocket support panel capable of hingedly storing a plurality of such file pockets, yet which is characterized by its portability. The present invention is particularly concerned with the former need; and, those interested in ascertaining details related to an invention concerned with the latter need are referred to the aforesaid related copending aplication, Ser. No. 461,538, filed Jan. 27, 1983 now U.S. Pat. No. 4,551,934.

SUMMARY OF THE INVENTION

A visible file pocket and methods for forming the same are disclosed which overcome the disadvantages inherent in conventional prior art constructions of the type described above and which readily permit of ease of manufacture on a continuous, in-line, mass production basis; yet, wherein the file pockets produced are characterized by their structural integrity, front-to-back symmetry, replicability, and durability. More specifically, file pockets formed in accordance with the present invention may readily be fabricated from two continuous sheets of coated polymeric material which are: (i) continuously heat sealed together along the major extent of the central web portions of the sheets while leaving the opposed longitudinal edges discrete, unsealed and unlaminated; (ii) the discrete, unsealed, unlaminated edges are then turned in opposite directions through angles of 90° to form a continuous, laminar, polymeric, central web having opposed T-shaped free edges; (iii) ribbons of polymeric material having widths greater than the heights of the crossbars on the two T-shaped edges are brought into substantial face-to-face contact with the outwardly presented faces of the T-shaped edges and heat sealed together while intially leaving central, longitudinally extending, gaps between each ribbon of polymeric material and the adjacent T-shaped edge with both of such gaps lying in the plane of the laminar continuous web; (iv) the thus heat sealed ribbons of polymeric material and their adjacent T-shaped edges are turned over upon the respective opposite faces of the continuous laminar web through additional angles on the order of 90° to form continuous front and back pocket tips along both opposed longitudinal edges of the laminar sheet web with the gap formed along one edge being closed and the ribbon of polymeric material heat sealed to the thus overturned edges of the laminar sheet in mutually coextensive face-to-face relation while the gap formed along the opposite edge is maintained and controlled to define a longitudinally extending bore sized to receive a hinge pin; (v) the thus formed pocket tips on the continuous laminar web are (a) passed through shaping elements or dies while heated to impart a desired final configuration thereto whereby the pocket tips are shaped to yieldably and compressibly retain documents inserted therein, and (b) cooled and set; and (vi), the continuous web is subdivided into discrete file pockets each having continuous front and back pocket tips formed along each of two opposed edges thereon and wherein one edge is provided with a through bore for receipt of a flexible hinge pin. Thereafter, hinge pins are inserted through the bores of the thus formed file pockets, projecting laterally from each end thereof; and, stationary hinge elements in, for example, the form of flat chips, are mounted on the projecting ends of the hinge pin. The flat chip-like hinge elements are preferably nonrotatably mounted on the hinge pins and preferably have a height equal to the height of the proximate pocket tips so that "n" (where "n" equals any whole integer) file pockets can be mounted in a file pocket panel support—for example, the file pocket panel support disclosed in the aforesaid related copending application Ser. No. 461,538, filed Jan. 27, 1983 now U.S. Pat. No. 4,551,934—in such a manner that all of the "n" hinge axes and all of the "n" proximate pocket tips lie in a common plane without being overlapped; the "n" remote pocket tips on the front faces of the "n" file pockets are overlapped to expose identifying file indicia contained therein or thereon; and, wherein the individual ones of the "n" file pockets may be easily pivoted about their respective hinge pins singly or in groups.

More specifically, it is a general aim of the present invention to provide an improved visible file pocket, and methods for forming the same, having symmetrical front and back pocket tips along both the upper and lower horizontal edges of the file pocket and wherein all pocket tips are continuous and devoid of separate fastening means so as to enable retention of equal sized documents on both the front and the back of the file pocket without having to form die cuts therein and/or special configurations in the documents to be filed.

In another of its important aspects, it is an object of the invention to provide methods for forming improved visible file pockets of the foregoing type which readily permit of modification by the user so that multiple documents of the same or unequal sizes can be conveniently retained captive on both the front and/or the back of the file pocket.

It is a further important objective of the present invention to provide methods for forming improved document file pockets of the foregoing character which can be repetitively used and reused for prolonged periods of time without significant risk of damage to the file pocket per se resulting from material fatigue or the like, and wherein a multiplicity of documents can be repetitively inserted into and removed from the pocket tips with ease and without denigrating the ability of the pocket tips to captively retain documents.

BRIEF DESCRIPTION OF THE DRAWINGS

These and other objects and advantages of the present invention will become more readily apparent upon reading the following detailed description and upon reference to the attached drawings, in which:

FIG. 7 is a partially exploded, fragmentary, perspective view of an exemplary visible document support or file pocket made in accordance with one form of the present invention;

FIG. 8 is a fragmentary, perspective view of a sheet of polymeric web material of a type suitable for making the document file pockets in accordance with the present invention;

FIG. 9 is a perspective view of a portable tray or panel for supporting a plurality of file pockets of the type shown in FIG. 7—such panel embodying features of the invention more fully disclosed in the aforesaid related copending application, Ser. No. 461,538, filed Jan. 27, 1983 now U.S. Pat. No. 4,551,934;

FIG. 10 is a perspective view similar to that shown in FIG. 9, but here illustrating the panel top stop and several of the file pockets pivoted to the open position about their hinged connections to the panel so as to expose a document supported on the reverse face of one of the pivoted file pockets and a document supported on the front face of one of the underlying file pockets;

FIG. 27 is an enlarged perspective view illustrating the juxtapositioning of a ribbon of coated polymeric material in partial face-to-face relation with one T-shaped edge of the laminar polymeric web;

FIG. 28 is a sectional view taken substantially along the line 28—28 in FIG. 23, here depicting the laminar polymeric web with its opposed T-shaped edges and a pair of coated polymeric ribbons entering guide channels through which the components transit during heating of the materials;

FIG. 29 is a sectional view taken substantially along the line 29—29 in FIG. 23, and here illustrating the initial stages of bonding of the polymeric ribbons to the T-shaped edges of the laminar central web as the components approach the exit ends of the guide channels and, illustrating particularly, the initial stages of the formation of the hinge pin receiving bore at the right-hand edge of the laminar polymeric web as viewed in the drawing;

FIG. 30 is a sectional view similar to FIG. 29, but here taken substantially along the line 30—30 in FIG. 23 located at the exit ends of the guide channels, and illustrating an exemplary pressure applying mechanism employed to effect longitudinal face-to-face heat-bonding between the ribbons and the T-shaped edges of the continuous laminar web both above and below the longitudinally extending central gaps therebetween;

FIG. 31 is a fragmentary perspective view illustrating that portion of the system wherein one T-shaped edge of the laminar polymeric web and the partially heat bonded polymeric ribbon are folded over upon the laminar central web to form the continuous front and back pocket tips on respective opposite faces of the continuous web from which a plurality of identical file pockets are formed;

FIG. 32 is a sectional view taken substantially along the line 32—32 in FIG. 23, and illustrating particularly the forming elements employed to initiate folding of the T-shaped edges and the partially bonded ribbons to form continuous front and back pocket tips on the opposite faces of the continuous laminar central web;

FIG. 33 is a sectional view taken substantially along the line 33—33 in FIG. 23, and here illustrating the polymeric components as they transit the heating elements employed for initiating final bonding of the now folded over laminated ribbons and edges defining the file pocket tips, and initial final shaping thereof;

FIG. 34 is a sectional view taken substantially along the line 34—34 in FIG. 33, and here illustrating the configuration of the left heater as viewed in the drawing for insuring ejection of entrapped air from the gap initially formed between the overturned ribbon and one T-shaped edge of the central web—here, the left edge remote from the edge in which a hinge pin receiving bore is being formed—and the resulting intimate, mutually coextensive, face-to-face bonding of the ribbon and web edges;

FIG. 35 is a fragmentary side elevational view of that portion of the system provided for setting the edges in their final pocket tip-defining configuration, here illustrating the left edge forming heater pivoted outwardly from its operative position so as to exhibit details of the heater profile;

FIG. 36 is a sectional view taken substantially along the line 36—36 in FIG. 35, here illustrating details of the left edge forming station which imparts a desired, somewhat curved, configuration to both the front and back pocket tips for permitting ease of document insertion and, at the same time, compressible and yieldable capture of the documents, it being understood that a somewhat similar right edge forming station is provided which differs therefrom only in that it is configured to accommodate a right edge including a hinge pin receiving bore;

FIG. 37 is a sectional view taken substantially along the line 37—37 in FIG. 23, here illustrating details of a special die configuration that may be employed at the exit end of the right edge forming station—i.e., that station similar to the left edge forming station shown in FIG. 36—for imparting any suitable desired special configuration at the edge of the file pocket incorporating the hinge pin receiving bore;

FIG. 38 is a sectional view taken substantially along the line 38—38 in FIG. 35, here illustrating further details of the edge forming and cooling system employed for forming, cooling and setting the shaped left edge of the file pocket web;

FIG. 39 is a fragmentary plan view illustrating details of the final edge forming station;

FIG. 40 is a sectional view taken substantially along the line 40—40 in FIG. 39, and illustrating further details of the final edge forming station;

FIG. 47 is a side elevational view of a folded web configured to yield a file pocket made in accordance with the present invention from a single sheet of polymeric material;

FIG. 48 is an end elevational view of the file pocket fabricated from the folded web shown in FIG. 47;

FIG. 49 is a perspective view showing a sheet of polymeric material of the type shown in FIG. 8 prior to adhesion to form a file pocket in accordance with yet another embodiment of the present invention;

FIG. 50 is a front elevational view of a file pocket embodying features of the present invention after heat bonding the folded web of FIG. 49;

Figure 1:
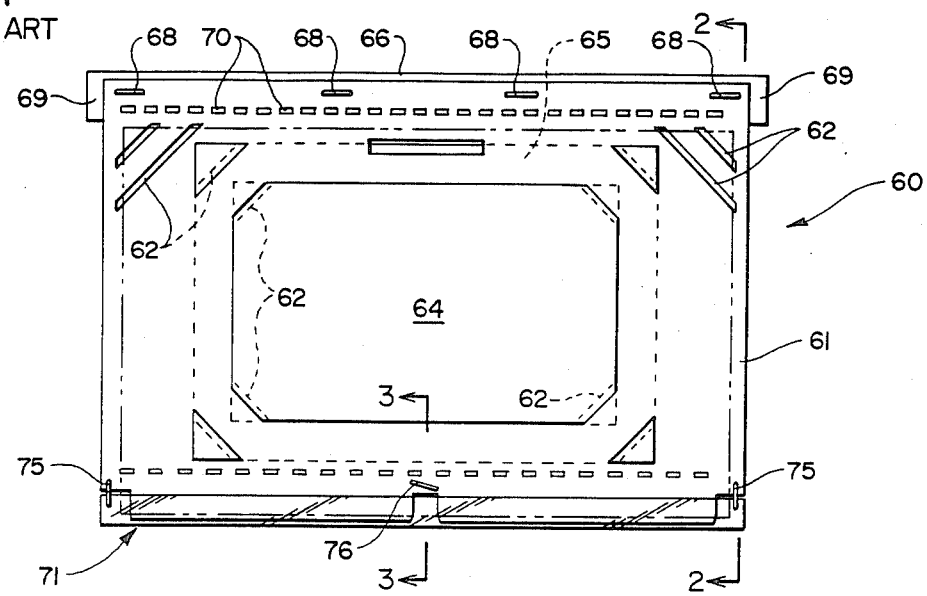
FIG. 1 is a plan view of a conventional document file pocket of the type commonly fabricated from paperboard or similar heavy paper stock, with the central paperboard web having a hanger-like support stapled along its upper edge and a plastic pocket tip-defining component stapled along its lower edge with the central paperboard web portion of the file pocket including a plurality of diagonal die cut slots positioned to support the corners of appropriately sized documents.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alternatives falling within the spirit and scope of the invention as expressed in the appended claims.

DETAILED DESCRIPTION

Environment Of The Invention

Figure 2:
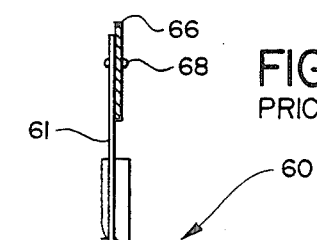
FIG. 2 is a sectional view taken substantially along the line 2—2 in FIG. 1, but here illustrating the various components in somewhat exaggerated form for purposes of clarity.
Figure 3:
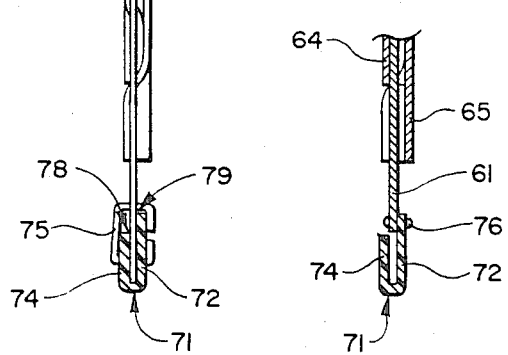
FIG. 3 is a sectional view taken substantially along the line 3—3 in FIG. 1, and depicting particularly the means for securing the plastic pocket tip-defining component to the central paperboard support web in the middle of the file pocket.

Turning first to FIGS. 1 through 3, conjointly, there has been illustrated a conventional prior art file pocket, generally indicated at 60, of the type which, prior to the advent of the present invention, had achieved perhaps the most widespread acceptance by businesses and/or industries requiring visible document filing systems. Thus, as here shown, the conventional file pocket 60 includes a central sheet-like support element 61 which is, and has for many years been, commonly made of heavy paper stock in rectangular form. The support element 61 normally includes an array of generally parallel die cut slots 62 which are oriented in a rectilinear pattern along diagonals of the support element. As here shown, a first document 64 is mounted on the front face of the structural element 61 in such a manner that the four corners of the document 64 project through four respective diagonal slots 62 for retention of the document 64 on the structural element 61. Thus, those four corners of document 64 project through the slots 62 in the structural element 61 from the front face thereof and lie generally parallel to the rear face of the structural element 61, as best indicated by reference to FIGS. 2 and 3. The same file pocket 60 is also shown retaining a second, somewhat larger, document 65 disposed on the rear face thereof. As with document 64, document 65 is likewise retained in position by having its four corners projected through a different set of four slots 62 from the rear face of element 61 so that the four corners of document 65 lie generally parallel to the front face of element 61. As can be readily appreciated, the use of a given pair of diagonal slots 62 to mount a document on one face of the file pocket 60 precludes the use of those same slots to mount a second document having the same dimensions on the opposite face of the file pocket 60 since, once a first document is secured on one face of the structural element 61, those particular slots will be blocked.

A separate strip 66 of paper, paperboard or the like is secured to the upper edge of the conventional file pocket 60 by a series of staples 68, four of which are shown in FIG. 1 for this purpose. The paper strip 66 is dimensioned to be somewhat longer than the length of the file pocket 60 to yield opposing, somewhat overhanging, portions 69 at either edge thereof. Strip 66 serves to rigidify the upper edge of the file pocket 60 while the overhanging portions 69 provide means for mounting the file pocket 60 within a tray support, as may be best visualized by reference to FIG. 6. A series of linearly disposed die cut slots 70 are formed near the upper edge of the support element 61, which series of slots defines a hinge line between the region of the support element 61 which receives the documents and the stiffened edge of the file pocket.

The lower edge of the structural element 61 has commonly been provided with a pocket tip-defining member, generally indicated at 71. The pocket tip-defining member 71 has typically been formed of a generally U-shaped piece of plastic, as best viewed in FIGS. 2 and 3, where one leg of the "U", designated 72, is somewhat longer than the other leg, designated 74. The pocket tip-defining member 71 is normally secured to the structural element 61 by means of staples 75 near both corners and by a central staple 76. Usually, the central staple 76 engages only the longer leg 72, as best viewed in FIG. 3. Accordingly, a first or front pocket tip, generally indicated at 78, is formed across the front face of the file pocket 60 between the lower edge portion of element 61 and the inside face of the leg 74; while a rear pocket tip, generally indicated at 79, is provided on the rear face of the file pocket 60 between the element 61 and the inside face of leg 72.

The two pocket tips 78, 79 serve as places to insert the lower edges of a pair of documents where the same are larger than might be accommodated by the array of slots 62, or as otherwise might be desired to display key information. When such an option to use the pocket tips 78, 79 is exercised, the location of the center staple 76 provides an unobstructed front pocket tip 78 but, because the staple must pass through and into engagement with the leg 72, a central obstruction of the rear pocket tip 79 is encountered. Accordingly, use of the rear pocket tip 79 may be made only if the document to be stored therein is die cut with a slot bridging the region of the center staple 76; a rather inconvenient requirement and one increasing the cost of the record forms. Moreover, in those instances where the documents to be mounted on the file pocket 60 have the same width as the support element 61, the presence of the end staples 75 require further die cuts in the documents and, of course, the upper corners of the documents must be similarly die cut in order to be accommodated within the diagonal slots 62.

Although file pockets of the type shown at 60 in FIGS. 1 through 3 have seen considerable commercial use and have been widely recognized as a convenient means for visibly displaying documents, there are certain drawbacks to the construction thereof. Usually, the support element 61 is formed of paper, as is the stiffening strip 66. After extended periods of use, the paper members begin to lose their integrity, requiring replacement of the entire file pocket. Obviously, records borne on the file pocket 60 must be transferred to a new one at that time. Likewise, because of the paper fabrication, there is a tendency for failure of the hinge defined by the lineal array of slots 70. The formation of an array of diagonal die cut slots in the paper body of the support element 61 tends to create weakened areas subject to tearing and/or fatigue. The need to staple the lower pocket tip-defining member 71 causes an obstruction intermediate the rear pocket tip 79 which, in turn, requires specially constructed documents if that pocket tip is to be used. Moreover, there is a tendency for the staples to loosen and/or tear the sheet materials through which they extend, thus resulting in the pocket tip-defining member 71 separating from the element 61. While some of the aforementioned problems might be eliminated by selection of alternate materials, other limitations are inherent in the design and simply cannot be eliminated without a wholesale reconstruction of the file pocket 60.

Figure 4:
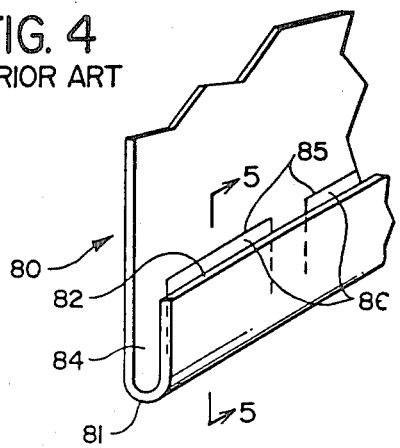
FIG. 4 is a fragmentary perspective view of the lower edge of a somewhat modified conventional file pocket of the type here formed from plastic sheet material.
Figure 5:
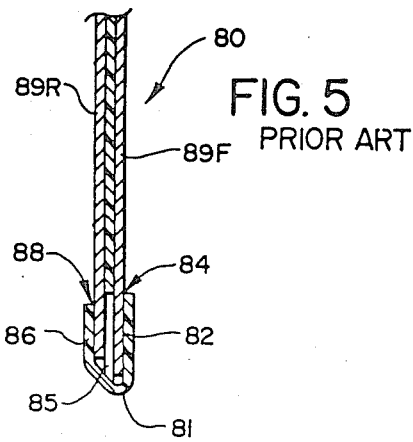
FIG. 5 is a sectional view taken substantially along the line 5—5 in FIG. 4 and here illustrating the conventional plastic file pocket supporting a pair of documents on the opposite faces thereof.

Recognizing many of the foregoing disadvantages inherent with the conventional file pockets 60 of the type shown in FIGS. 1–3, a somewhat modified file pocket, a fragmentary portion of which has been generally indicated at 80 in FIGS. 4 and 5, has been developed. In this type of construction, the file pocket is generally formed of plastic material in sheet-like form and is folded and heat set along its lower edge 81 to provide an upturned lip 82 defining a continuous, longitudinally extending, pocket tip 84 coextensive with the bottom edge 81 of the file pocket 80 and on the front face thereof. The plastic sheet is provided with one or more inverted U-shaped slits 85 extending therethrough, generally in the region underlying the upturned lip 82, thereby permitting the tabs 86 defined by the slits 85 to be projected rearwardly out of the plane of the plastic sheet so as to form a discontinuous pocket-tip 88 on the rear face of the file pocket 80, as best illustrated in FIG. 5. Once again, however, the configuration of the front and back pocket tips 84, 88 is generally such that documents 89F and 89R respectively mounted in the front and rear pocket tips are either of different sizes or must be specially shaped in the region of the discontinuity bridging adjacent tabs 86. Moreover, this type of known construction fails to provide pocket tips which are capable of compressibly and yieldably retaining documents captive therein.

Figure 6:
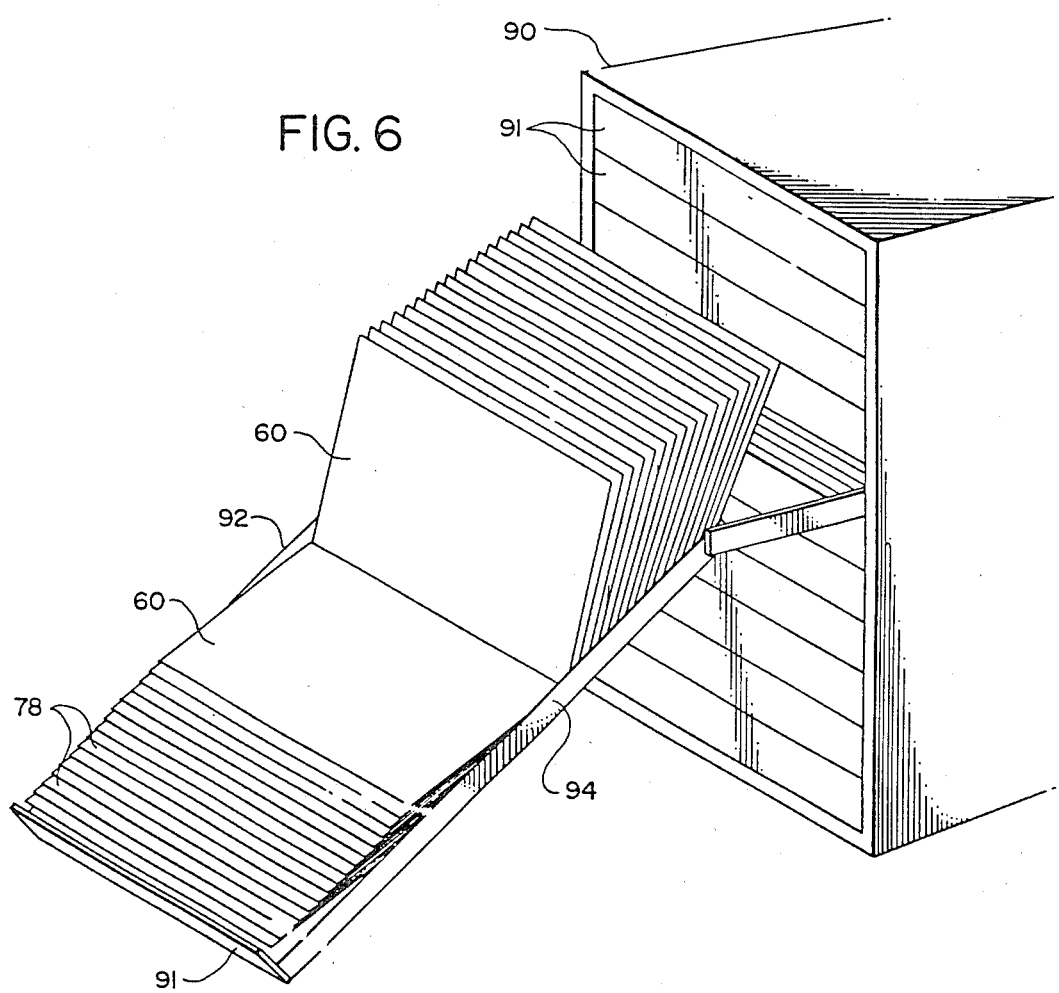
FIG. 6 is a perspective view of an exemplary file cabinet for supporting a series of trays or panels, each of which is adapted to hingedly receive a plurality of conventional document file pockets.

Referring next to FIG. 6, there has been illustrated a typical storage system for permitting storage of visible file pockets of, for example, the type indicated at 60 in FIGS. 1–3. As here shown, the exemplary conventional storage system includes a file cabinet 90 having a plurality of identical storage trays 91, each of which is provided with a pair of channel-like tracks 92, 94 for receiving the projecting ends 69 (FIG. 1) of the file pocket stiffening element 66. Thus, the arrangement is such that any given tray 91 can be withdrawn from the file cabinet 90 to display a plurality of file pockets 60 hingedly mounted therein in partially overlapped relation, with the lower pocket tip 78 on the front faces of all file pockets 60 being visibly displayed so that the user can immediately locate a particular file pocket of interest by reference to identifying indicia contained in the region of the pocket tip 78.

File Pocket Made In Accordance With The Invention And Support Panel Therefor Referring now to FIG. 7, there has been illustrated, in fragmentary, somewhat diagrammatic, form, one type of exemplary file pocket, generally indicated at 100, made in accordance with the present invention. As here shown, the exemplary file pocket 100 includes a laminar central web 101 formed from two sheets of polymeric material heat sealed together and terminating at its lower and upper horizontal edges (as viewed in the drawing) in lower front and back upturned pocket tips 102, 103 and upper front and back downturned pocket tips 104, 105, all of which define with the central web 101 horizontally extending continuous cavities 106 adapted to receive the lower and upper horizontal edges of one or more documents (not shown) for captively retaining such documents therein and in a position where suitable entries may be made on the exposed face of each document and/or wherein a given document may be removed, reinserted or replaced with a different document. As will be apparent upon inspection of FIG. 7, the exemplary file pocket 100 is characterized by front-to-back symmetry--that is, the lower front and back pocket tips 102, 103 are identical, as are the upper front and back pocket tips 104, 105; and, all four pocket tips define continuous cavities 106, thereby readily permitting display of two identically sized documents on the front and back faces of the file. pocket.

For the purpose of permitting the file pocket 100 to be hingedly mounted in a tray or support panel of the type more fully disclosed and claimed in the aforesaid related copending Application, Ser. No. 461,538, filed Jan. 27, 1983, the upper edge 108 of the file pocket 100 as viewed in the drawings is provided with a transversely extending bore 109 through which extends a suitable flexible hinge pin 110 which projects from both vertical edges of the file pocket--while only the left edge of the file pocket 100 and projecting portion of hinge pin 110 are visible in FIG. 7, it will be understood that the hinge pin 110 similarly projects from the right edge of the file pocket. After insertion of the hinge pin 110 through bore 109, both projecting ends of the hinge pin are preferably formed with diametrically extending flats 111. Hinge elements 112 formed of, for example, suitable sheet plastic material or the like in rectangular chip form, are mounted on the projecting ends of hinge pin 110 with the hinge pin flats 111 being forced into the chip-like hinge elements 112, thus nonrotatably mounting the hinge elements 112 on the opposite projecting ends of the hinge pin 110.

In keeping with the broader aspects of the present invention, the file pocket 100 is made from a double ply of polymeric material wherein the two plies are heat sealed together in face-to-face relation to form a unitary laminar central web portion 101 for the file pocket. A portion of a suitable coated polymeric sheet material has been illustrated in FIG. 8; and, is generally designated by the reference numeral 114. It has been found that a particularly suitable polymeric material 114 for the practice of the present invention comprises a sheet 115 of polyester, such as that sold under the trademark "MYLAR", which is on the order of three mils in thickness and which has formed on one surface thereof a film 116 of heat-bondable polyethylene generally on the order of two mils in thickness. This type of conventional polymeric material is well known to persons skilled in the art and has commonly been used to laminate, for example, photographs, licenses and similar documents which are sandwiched between two sheets of such coated material having the heat-bondable polyethylene surfaces 116 in face-to-face relation and, thereafter, applying a heat-seal effective pressure and temperature to form the laminated sandwich. The facing polyester surfaces 116 respond to the laminating treatment to form a unitary, integral, composite laminated structure containing the document to be laminated. It has been found possible to employ a somewhat similar laminating technique to form the central web 101 for the file pocket 100 shown in FIG. 7—i.e., two sheets of polyethylene coated polymeric material are placed in face-to-face relation and heat sealed together over the major central portion thereof to produce the laminar central web; but, wherein provision is made for inhibiting heat sealing of the two plies of coated polymeric material along two opposed longitudinal edges thereof, thereby enabling those unlaminated, unsealed longitudinal edges to be subsequently folded over during further processing steps to form the upper and lower pocket tips 102, 103, 104, 105 and hinge pin receiving bore 109.

As more fully disclosed and claimed in the aforesaid related copending Application, Ser. No. 461,538, filed Jan. 27, 1983, now U.S. Pat. No. 4,551,934, a lightweight, portable, visible file pocket support panel, generally indicated at 120 in FIGS. 9 and 10, is provided for hingedly supporting "n" (where "n" is any desired whole integer) file pockets 100 in a compact, flat, overlapped array wherein the lower front pocket tips 102 of all of such "n" file pockets are visible; and, therefore, permitting the display of suitable identifying indicia for the documents stored in each different file pocket. To this end, and as best illustrated by reference to FIGS. 11 through 14 conjointly, the exemplary file pocket support panel 120 includes a base member, generally indicated at 121, having a laterally extending peripheral flange 122 and a central, rearwardly descending, inclined ramp 124. A generally E-shaped edge defining channel member 125 is provided which surrounds at least the front and two side edges of the base member 121, such channel member 125 having horziontally extending lower, intermediate and upper legs 126, 127, 128 defining longitudinally extending lower and upper slots 129, 130, and a vertically extending flange 131 formed at the free end of the channel member's upper horizontal leg 128. In order to protect the documents, the support panel 120 may optionally be provided with a cover or top plate 132 preferably formed of clear sheet plastic material and hingedly connected to the rear edge of the base member 121 by a suitable hinge 134 and conventional fastening means such as rivets or the like (not shown).

Figure 11:
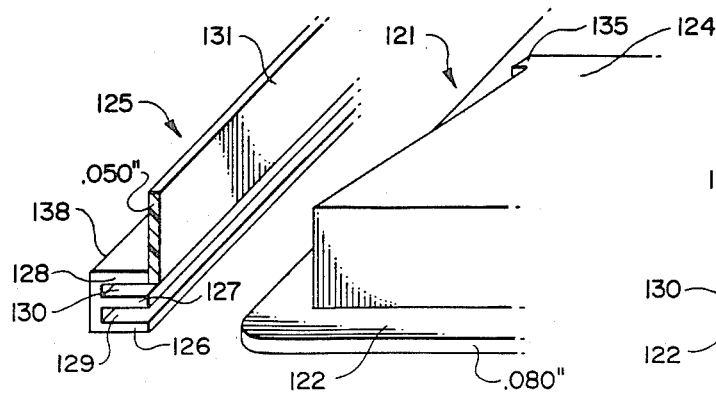
FIG. 11 is a fragmentary, exploded, perspective view illustrating two of the basic components from which the portable tray or panel shown in FIGS. 9 and 10 is constructed.
Figure 12:
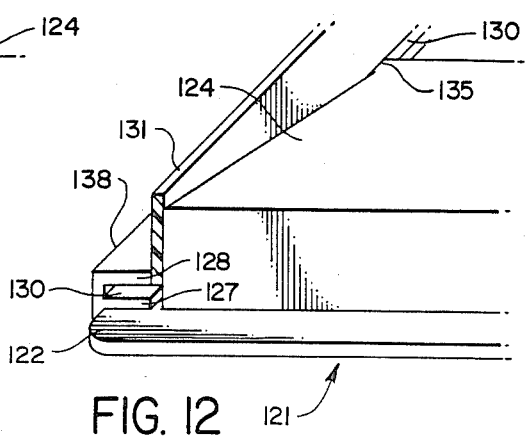
FIG. 12 is a fragmentary perspective view, partly in section, here illustrating the two basic components shown in FIG. 11 in assembled form.
Figure 13:
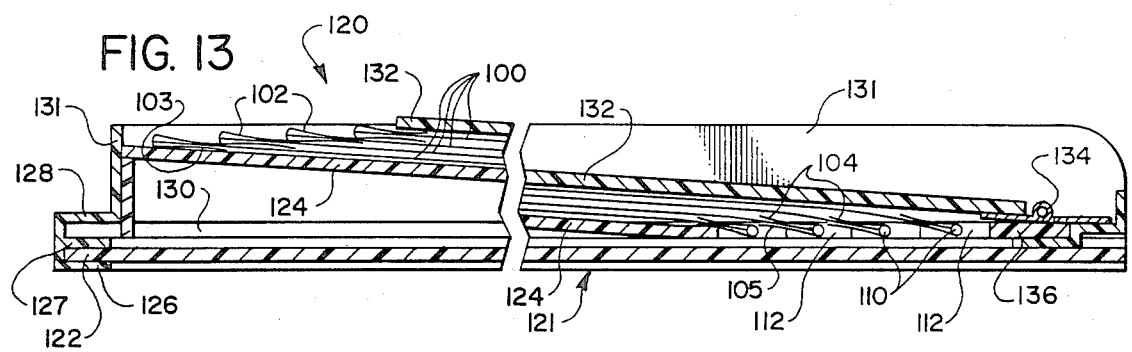
FIG. 13 is a sectional view taken substantially along the line 13—13 in FIG. 9, and particularly depicting the overlapping relation of a plurality of file pockets mounted in the portable tray or panel.

To assemble the illustrative support panel 120, the laterally projecting flange 122 on base member 121 is positioned within the lower slot 129 of the edge defining channel member 125 and bonded in place, while laterally projecting tabs disposed at the rear end of the rearwardly descending inclined ramp 124 (one of which is shown at 135 in FIG. 11) are bonded in place within the upper slot 130 in the channel member 125, as best shown in FIGS. 11 and 12. The edge defining channel member 125 may be applied to the two side and front edges (and, if desired, the back edge) of the base member 121 in three (or four) separate pieces or, if desired, as one continuous piece. In the latter case, it is merely necessary to cut through the horizontal legs 126, 127, 128 of the edge defining channel member (while leaving the vertical flange 131 intact) at those points corresponding to the corners of the base member 121 about which the channel member is to be wrapped, thereby enabling a single continuous length of channel member 125 to be wrapped about the base member with the vertical flange 131 being bent through angles of 90° at each corner of the device, an arrangement most clearly visible in FIG. 10.

Figure 14:
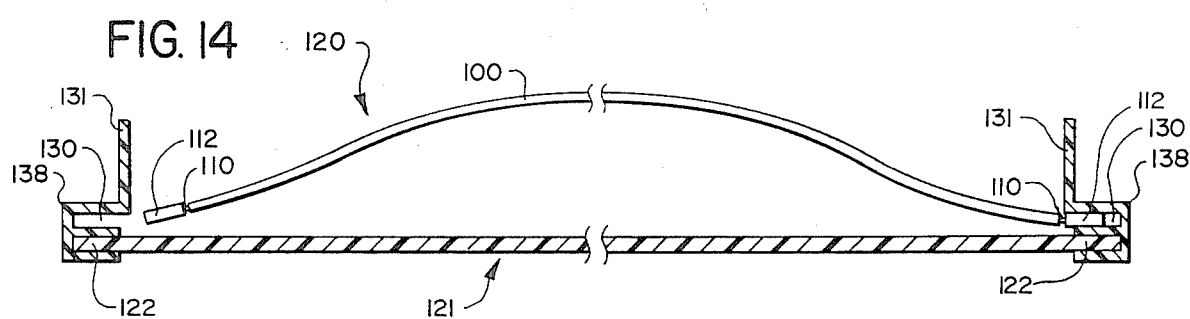
FIG. 14 is a sectional view taken substantially along the line 14—14 in FIG. 10, and here illustrating the manner in which a file pocket made in accordance with the present invention is removed from and/or inserted into the portable tray or panel.

When assembled in either of the foregoing manners, and as best depicted in FIG. 12, it will be noted that the rearwardly descending ramp 124 serves to occupy and/or overlie the upper slot 130 in the edge defining member 125 at all areas coextensive with the ramp 124; while the slot 130 is open and exposed rearwardly of the ramp 124. Thus, the arrangement is such that when one wishes to insert a file pocket 100 (FIG. 7) into the file pocket support panel 120, it is merely necessary to first insert one of the chip-like hinge elements 112 into the upper slot 130 along one side of the panel while flexing the file pocket 100 and hinge pin in the manner best shown in FIG. 14. Thereafter, the opposite hinge element 112 is inserted into the upper slot 130 on the other side of the panel 120. In this construction, the flat rectangular shape of the hinge elements 112 and their non-rotatable connection with the hinge pin 110 defines a stationary hinge axis permitting each file pocket 100 to be rotated about its hinge pin 110 between the positions shown in FIG. 10. Suitable stops (one such stop being illustrated at 136 in FIG. 13) are positioned in the rear ends of each exposed slot 130 for preventing rearward movement of the hinge elements 112 within the slots 130; while forward movement of the hinge elements is precluded by the tabs 135 on the ramp 134. Thus, the file pockets 100 are fixedly positioned in the support panel 120 with freedom for pivotal movement, while each file pocket 100 can be easily inserted into or removed from the panel 120 by the simple expedient of flexing the hinge pin 110 and moving the hinge elements 112 laterally relative to the confining slots 130—i.e., either into or out of the slots as shown in FIG. 14. Referring to FIGS. 10 and 14 conjointly, it will be observed that in the foregoing exemplary construction, the edge defining channel member 125 provides a rearwardly extending laterally projecting flange 138 along each opposed side edge of the panel 120 which readily permits the panel to be slidably mounted in a suitable file cabinet having complementally shaped opposed tracks (not shown).

Methods And Apparatus For Forming A File Pocket In Accordance With The Invention A. System Overview Turning first to FIG. 15, there has been illustrated an exemplary continuous in-line production system, generally indicated at 140, which is suitable for manufacturing file pockets 100, such as that shown in greater detail in FIG. 7, in accordance with the principal objectives of the present invention. Briefly, and as here shown in highly simplified diagrammatic form with numerous parts removed for purposes of clarity, the illustrative production system 140 includes a laminating station, generally indicated at 150, wherein two sheets of coated polymeric film of the type shown in FIG. 8, generally indicated at 114U, 114L, are continuously fed from a pair of supply rolls 151, 152, respectively, through two pairs of laminating rolls 154, 155 and 156, 157 which serve to heat seal and laminate the major central portion of the two sheets 114U, 114L together to form a continuous laminar web 101 wherein the opposed longitudinal edges 101A, 101B thereof remain unsealed and unlaminated. The thus partially—i.e., centrally—laminated continuous web 101 is fed through a cooling station 170 to a first edge forming station 180 where the unlaminated edges 101A, 101B defined by the two plies of polymeric material 114U, 114L are spread apart and turned or folded through angles of 90° to form left and right T-shaped edges, generally indicated at 181L, 181R—viz., that portion of each of the unlaminated edges 101A, 101B defined by the sheet 114U drawn from supply roll 151 is turned upwardly through a 90° angle, while that portion of each unlaminated edge 101A, 101B defined by the sheet 114L drawn from supply roll 152 is turned downwardly through a 90° angle; thereby forming a laminated central web 101 with longitudinally extending left and right T-shaped edges 181L, 181R.

At this stage in the process, the continuous laminar web 101 with its T-shaped longitudinal edges 181L, 181R, is fed sequentially through second, third and fourth edge forming stations 200, 220 and 230, respectively. Thus, in edge forming station 200, left and right ribbons of coated polymeric material 201L, 201R are brought into generally face-to-face relation with the T-shaped longitudinal edges 181L, 181R, respectively, on laminated web 101. As will be hereinafter more fully described, the width of each of the ribbons 201L, 201R is somewhat greater than the height of its associated vertical T-shaped edge 181L, 181R; and, consequently, when the edges of the ribbons and the upper and lower extremities of the T-shaped edges are aligned edge-to-edge, the ribbons tend to bow outwardly so as to produce left and right longitudinally extending gaps between the ribbons and the T-shaped edges; such gaps being located in the plane of the continuous laminar web 101. Except for such gaps, the ribbons 201L, 201R and T-shaped longitudinal edges 181L, 181R, when aligned edge-to-edge and heated, are heat-bonded together along their mutually engaged longitudinal faces above and below the longitudinally extending gaps.

As the thus formed continuous laminar web 101 exits from the second edge forming station 200 and enters the third edge forming station 220, the partially laminated ribbons 201L, 201R and their associated T-shaped edges 181L, 181R are folded over through additional angles of about 90° so as to overlie and underlie the laminar central web 101 along both longitudinal edges thereof. The web 101 and its thus folded over edges are then passed through the fourth edge forming station 230 where: (i) they are heated; (ii) the edges are shaped to form longitudinally continuous front and back (i.e., upper and lower as viewed in the drawing) pocket tips along both longitudinal web edges; (iii) entrapped air in the gap along the left edge 101A is expressed from the gap to provide mutually coextensive face-to-face heat-bonding between the ribbon 201L and the now folded over T-shaped edge 181L; (iv) the gap along the opposite longitudinal edge 101B of the web 101 is controlled and shaped to define a hinge pin receiving bore (109 in FIG. 7); (v) the two thus formed folded over edges are shaped to form a desired finished front and back pocket tip configuration along both longitudinal edges; and (vi), the two folded over longitudinal edges 101A, 101B defining front and back lower pocket tips (edge 101A) and front and back upper pocket tips with an included hinge pin receiving bore (edge 101B) are cooled and set. Finally, in station 270, the continuous laminar web 101 with the thus formed front and back, lower and upper pocket tips (the lower and upper pocket tips shown in FIG. 7 having been respectively formed along the left and right edges 101A, 101B of the web 101 in FIG. 15) is then cut transversely of the web to form individual, discrete file pockets 100 of the type shown in FIG. 7 embodying features of the present invention.

Figure 15:
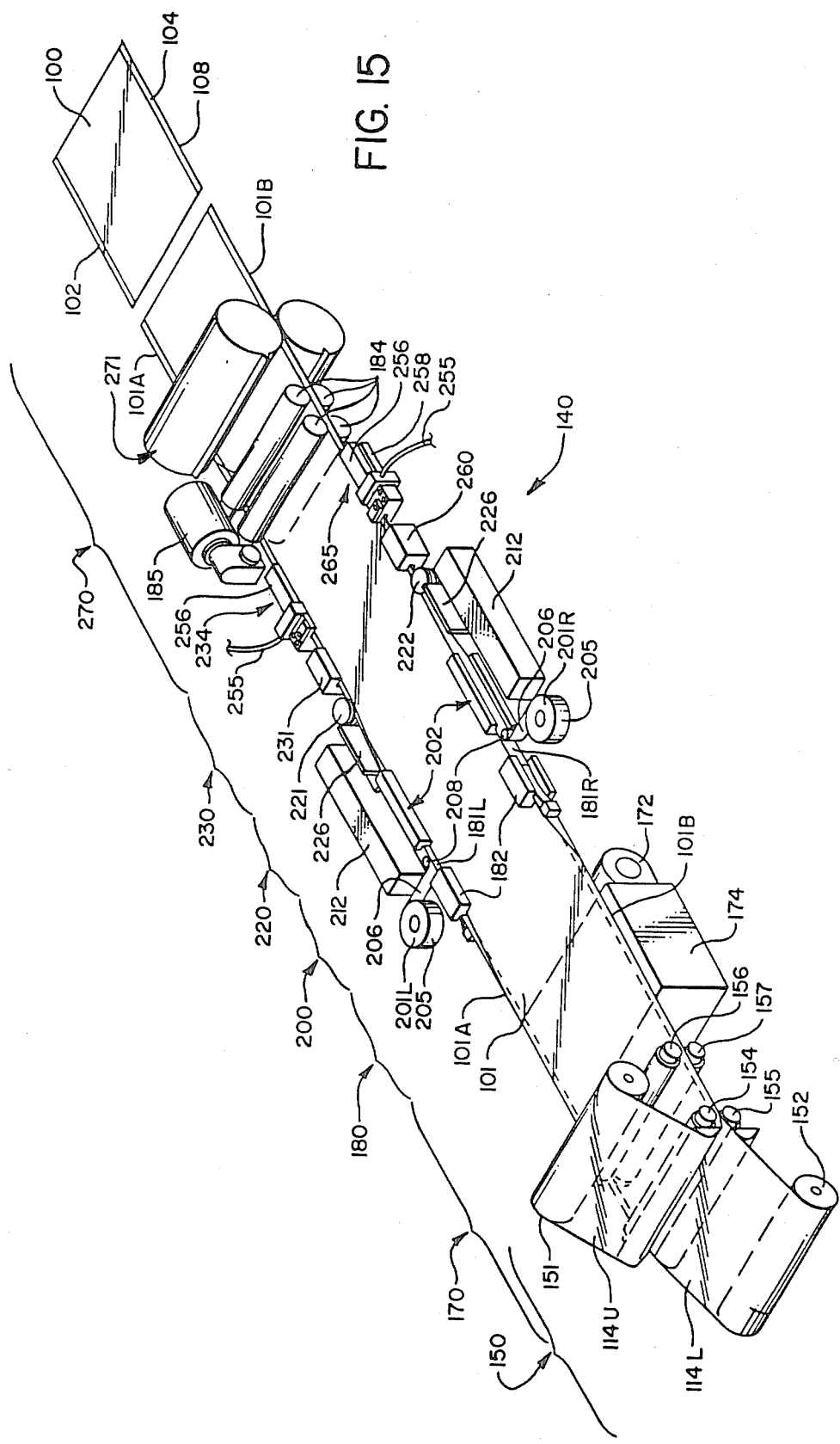
FIG. 15 is a highly diagrammatic perspective line drawing, here illustrating the sequential process stages and exemplary equipment for forming a plurality of file pockets in accordance with the present invention from continuously fed polymeric sheets drawn from a pair of supply rolls.

Having in mind the general arrangement of the exemplary in-line production system 140 shown diagrammatically in FIG. 15, and upon reference to FIGS. 16a through 16f, it will be noted that certain of the manipulative steps carried out with respect to the polymeric sheet materials have been shown diagrammatically in order to facilitate an understanding of certain of the more important features of the present invention. Thus, considering FIGS. 15, 16a and 16b conjointly, it will be observed that the upper and lower continuous polymeric sheets 114U, 114L are oriented on their supply rolls 151, 152, respectively, so that the heat-bondable polyethylene surfaces 116 formed on the polyester sheet materials 115 are placed in face-to-face relation as they enter the nip defined by the first set of pressure rolls 154, 155. As the polymeric materials exit from the laminating station 150, they define a continuous laminar web 101 which, as most clearly shown in FIG. 16b comprises an integral, unitary, heat-bonded central laminar web portion 101 having continuous longitudinal edges 101A, 101B defined by polyester laminations 115 having heat-bondable polyethylene films 116 disposed in face-to-face relation.

Figure 16A:
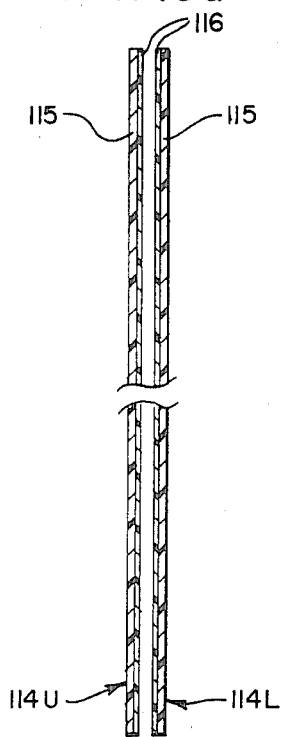
FIGS. 16a through 16f are a series of diagrammatic sectional views through the sheets of polymeric material employed to form file pockets of the type shown in FIG. 7 in accordance with the present invention, and here illustrating the configuration of the sheet material at various sequential stages in the sequence of processing steps.
Figure 16B:
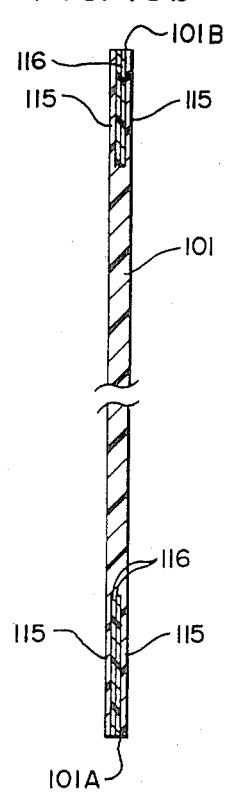
Figure 16C:
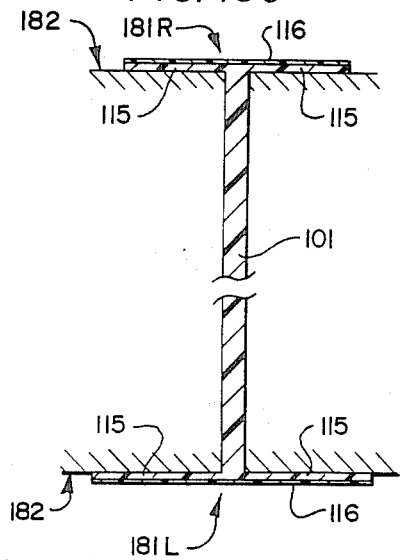

As the continuous laminar web 101 with its unbonded, unlaminated edges 101A, 101B transits edge-forming station 180, the unlaminated edges 101A, 101B are spread apart and bent upwardly and downwardly (as viewed in FIG. 15) along each longitudinal edge with the thus bent edges defining T-shaped edges 181L, 181R which pass through heated guide channels, generally indicated at 182, wherein the edges are heat-set in their T-shaped configurations (FIG. 16c).

Figure 16D:
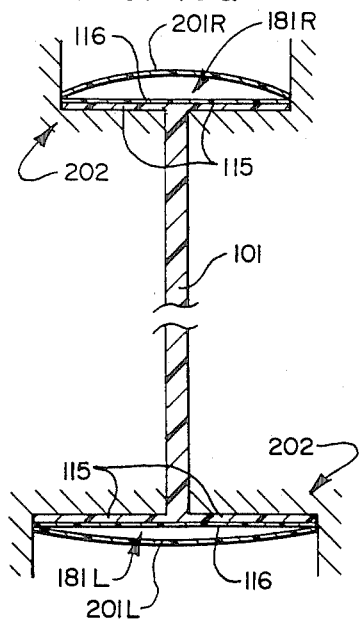
Figure 16E:
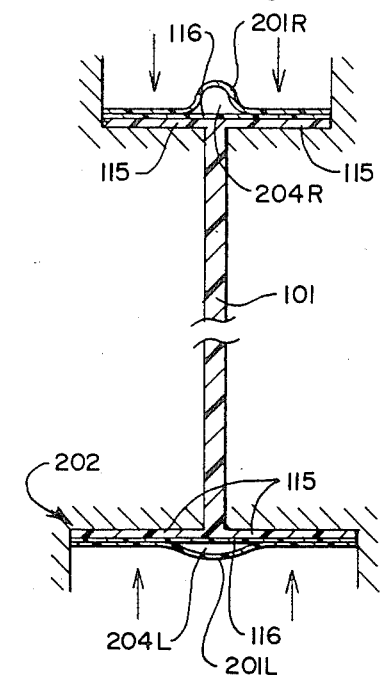
Figure 16F:
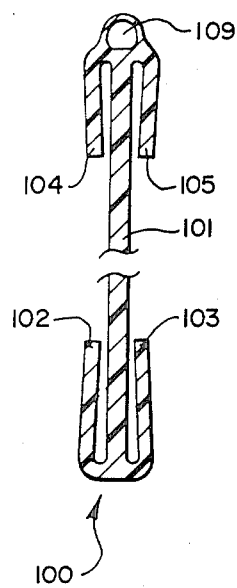

Considering FIGS. 15, 16d and 16e conjointly, it will be noted that as the continuous laminar web 101 transits the second edge forming station 200, ribbons of coated polymeric material 201L, 201R are respectively brought into generally face-to-face relation with the previously formed T-shaped edges 181L, 181R, respectively. In keeping with the invention, the ribbons 201L, 201R have a slightly greater width than the height of the crossbars on the T-shaped edges 181L, 181R; and, consequently, as the polymeric components pass through left and right guide channels, generally indicated at 202, the guide channels serve to align the edges of the ribbons 201L, 201R with the free ends of the T-shaped edges 181L, 181R; and, therefore, the ribbons assume an outwardly bowed configuration. As the web 101 and ribbons pass through the second edge forming station 200, a heat-sealing effective pressure is applied along the upper and lower edges of the ribbons 201L, 201R (as indicated by the arrows in FIG. 16e) which serves to bond the ribbons to the T-shaped edges in such a manner that longitudinally extending gaps 204L, 204R (FIG. 16e) are formed therebetween lying in the plane of the laminar central web 101. As the ensuing description proceeds, those skilled in the art will appreciate that the left gap 204L is provided solely to accommodate subsequent bending of the partially bonded ribbon 201L and T-shaped edge 181L while maintaining those two components in edge-to-edge alignment; and, as those components are bent through additional angles of 90° so as to overlie and underlie the central web 101 and define lower front and back pocket tips 102, 103, the air entrapped within gap 204L is expressed and the ribbon 201L and now U-shaped pocket tip-defining edge are brought into mutually coextensive face-to-face relation totally devoid of any gap (Cf., FIGS. 16e and 16f).

However, in the practice of the invention, there is a considerably greater differential width between the right ribbon 201R and its associated right T-shaped edge 181R than exists between the left ribbon 201L and its associated T-shaped edge 181L; and, consequently, gap 204R is considerably larger than is gap 204L. As a consequence, there is sufficient polymeric ribbon material at the right edge of the web 101 to insure that the edges of ribbon 201R and the free ends of the T-shaped edge 181R remain in edge-to-edge relation as they are bent through further angles of 90° to overlie and underlie the laminar central web 101 so as to form upper front and back pockets 104, 105 (FIG. 16f); while, at the same time, the excess ribbon width insures that all of the air entrapped within gap 204R is not expressed and, therefore, the gap 204R defines a hinge pin receiving bore 109.

B. Laminating And Cooling Stations 150, 170

Turning now to FIGS. 17 through 20 conjointly, the sequential process steps and exemplary equipment employed for producing a centrally laminated, continuous, dual ply, polymeric web 101 having longitudinally extending unlaminated edges 101A, 101B, such as depicted in FIG. 16b, have been shown in considerably greater detail. Thus, as here shown, a generally conventional film laminator 158 is provided which has been modified somewhat in order to produce the desired results. More specifically, the exemplary laminator 158 includes parallel, spaced idler shafts 159, 160 for supporting supply rolls 151, 152 of coated polymeric sheet material. The sheet 114U of polymeric material drawn from the upper supply roll 151 is passed under a transversely extending guide bar 161, around a suitable heater 162, and into the nip defined by pressure rolls 154, 155 with its heat-bondable polyethylene film surface 116 (FIGS. 7 and 16a) in a downwardly presented position—i.e., facing lower pressure roll 155. Similarly, the continuous lower sheet 114L drawn from supply roll 152 passes about a guide bar 163 and around a suitable heater 164, with the thus heated lower sheet 114L entering the nip defined by pressure rolls 154, 155 with its heat-bondable polyethylene film surface 116 (FIGS. 7 and 16a) facing upwardly—i.e., facing upper pressure roll 154—and, consequently, the upper and lower heated sheets 114U, 114L pass through the nip defined by pressure rolls 154, 155 with their heated polyethylene surface films 116 in face-to-face relation, thereby permitting heat bonding of the film surfaces together to form a unitary, laminar, continuous web 101.

When laminating the two sheets of polymeric material 114U, 114L in accordance with the present invention, it has been found desirable to uniformly heat the polymeric material sheets across the entire transverse width thereof as contrasted with heating only the central portions that are to be bonded together—that is, even though it is intended to leave the longitudinal edges 101A, 101B in unlaminated, unbonded condition as hereinabove described and as shown in FIG. 16b, it has been found highly desirable to heat these longitudinal edge portions of the sheets 114U, 114L uniformly with the central portion so as to eliminate development of a wavy, crinkled or corrugated edge configuration which would inherently result from heat shrinkage of the material if portions of the polymeric material sheets were differentially heated. As a consequence, the heaters 162, 164 extend entirely across the laminator 158 and have effective heating surfaces which are as wide as, or greater in width than, the width of the sheets 114U, 114L.

Figure 17:
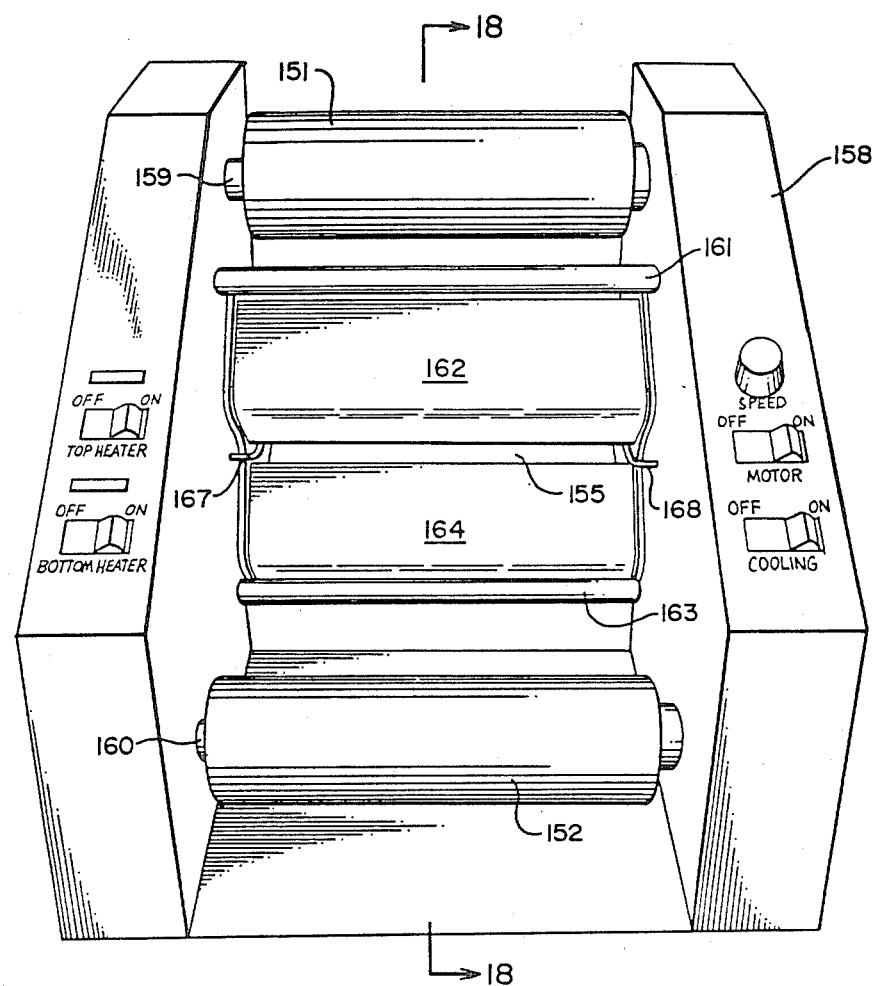
FIG. 17 is a frontal perspective view of a laminator suitable for laminating a pair of coated polymeric sheets together over the major central area of the sheets while leaving the two opposed longitudinal edges in generally face-to-face, unsealed, nonlaminated condition.
Figure 18:
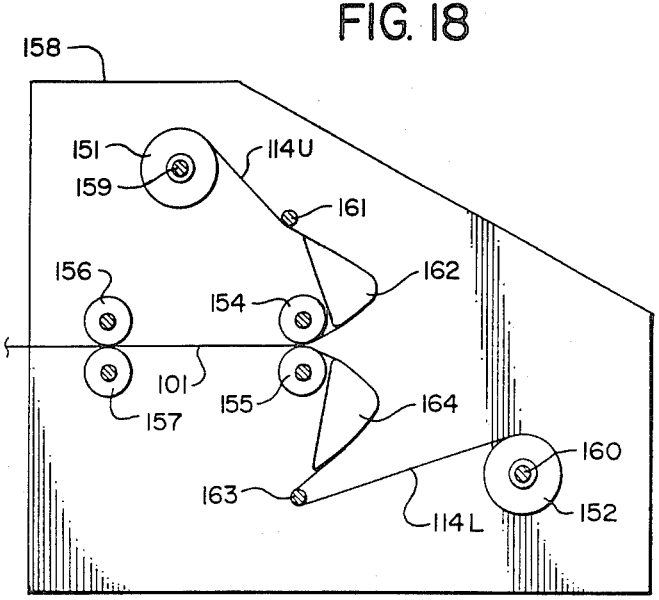
FIG. 18 is a highly simplified, diagrammatic, vertical, sectional view taken substantially along the line 18—18 in FIG. 17, with parts removed and other parts shown in line form for purposes of clarity, and here illustrating the feed paths through the laminator for a pair of coated polymeric sheets fed from respective ones of a pair of supply rolls.
Figure 19:
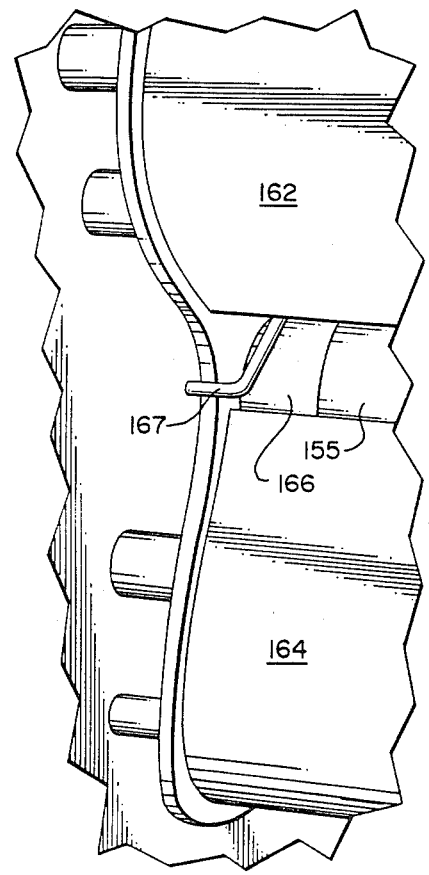
FIG. 19 is an enlarged, fragmentary, frontal perspective view of a portion of the laminator shown in FIG. 17, here illustrating certain of those details of the laminator construction which are provided for insuring that the free edges of the laminated polymeric sheets remain unsealed and unlaminated.
Figure 20:
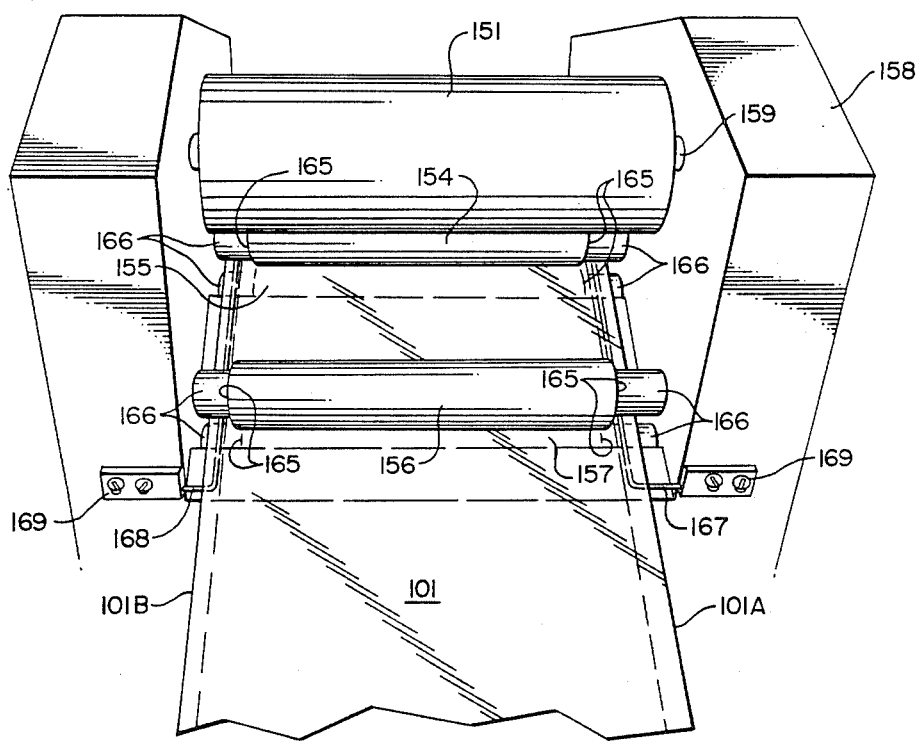
FIG. 20 is a rear perspective view of the exit end of the laminator and illustrating, in somewhat greater detail, an exemplary construction employed for insuring that the opposed free edges of the laminated polymeric sheets remain unsealed and unlaminated.

In order to prevent heat bonding and/or lamination of the thus heated longitudinal edge portions 101A, 101B of the polymeric sheets 114U, 114L, provision is made for applying heat-sealing effective pressure only to the central region of the sheets as they pass through the pressure nips defined by the first and second sets of pressure rolls 154, 155 and 156, 157 while maintaining the heated longitudinal edge portions of the sheets 114U, 114L in spaced apart relation until such time as the heated material has been cooled and set. To accomplish this, and as best illustrated by reference to FIGS. 19 and 20, the opposite ends of the pressure rolls 154, 155, 156, 157 are provided with reduced diameters defining radial shoulders 165 and vertically spaced shaft ends 166—i.e., the two sets of pressure rolls 154, 155 and 156, 157 each define a pressure nip coextensive with their central portions and vertical gaps between the reduced diameter shaft ends 166. To maintain the heated longitudinal edges of the upper and lower sheets 114U, 114L out of face-to-face contact as they pass through the first and second sets of pressure rolls 154, 155 and 156, 157, a pair of horizontally extending left and right C-shaped separator rods 167, 168 are secured to the rear wall of the laminator 158, as indicated at 169, and extend forwardly through the gaps defined by the reduced diameter shaft ends 166, terminating forwardly of the first set of pressure rolls 154, 155, as best indicated in FIG. 17.

The arrangement is such that the upper sheet 114U of polymeric material wrapped about heater 162 and entering the nip between pressure rolls 153, 154 has its left and right edges (as viewed in FIG. 17) passing over the left and right C-shaped separator rods 167, 168, while the lower sheet 114L drawn from supply roll 152 passes around heater 164 and into the nip defined by pressure rolls 154, 155 with its left and right edges passing under the C-shaped separator rods 167, 168. Thus, the absence of a pressure applying nip in the gap regions defined by the reduced diameter ends 166 of the four pressure rolls, coupled with the presence of stationary, longitudinally extending, separator rods 167, 168 intermediate the heated longitudinal edges of the upper and lower sheets 114U, 114L, serves to effectively prevent edge bonding of the two sheets while permitting bonding of the central region thereof and producing a centrally laminated web 101 of the type shown in FIG. 16b at the output side of the laminator 158.

The axial extent of the reduced diameter shaft ends 166 will, of course, be determinative of the width of the unlaminated longitudinal edges 101A, 101B and, consequently, of the depth of the upper and lower pocket tips 102, 103 and 104, 105 on the file pocket 100 (FIG. 7). For example, if it is assumed that the exemplary file pocket 100 (FIG. 7) is intended to accept, store and visibly display documents 11 inches in width and 8 ½ inches in height, then it has been found desirable that the lower pocket tips 102, 103 have interior depths on the order of about 15/32 inch while the upper pocket tips 104, 105 have interior depths on the order of about ⅜ inch. Consequently, the laminated central portion of the continuous web 101 (FIG. 16b) will desirably be about 8 17/32 inches in width, the unlaminated portion of the upper and lower sheets 114U, 114L adjacent the left edge 101A (FIGS. 15 and 16b) will be approximately 15/32 inch wide, and the unlaminated portion of the upper and lower sheets 114U, 114L adjacent the right edge 101B (FIGS. 15 and 16b) will be approximately ⅜ inch wide. Thus, the transverse width of the sheets 114U, 114L fed through the laminator 158 in this exemplary case would be approximately 9 ⅜ inch—i.e., 8 17/32 inches plus 15/32 inch plus 3/8 inch--and the pressure rolls 154 through 157 would be shaped to define a pressure nip 8 17/32 inches in width and gaps at the reduced diameter shaft ends 166 of sufficient axial length to accommodate an unlaminated left edge 101A (FIG. 16b) 15/32 inch in width and an unlaminated right edge 101B ⅜ inch in width.

In carrying out this aspect of the invention, provision is made for at least partially cooling and setting the heated centrally laminated web 101 defined by the upper and lower plies 114U, 114L of coated polymeric material prior to exit of the web from the laminating station 150. To accomplish this, the modified conventional laminator 158 includes a source of suitable cooling air, here supplied by a fan (shown diagrammatically in block form at 171 in FIG. 21) which serves to direct a coolant air stream upwardly against and around the polymeric web materials intermediate the first and second pairs of pressure rolls 154, 155 and 156, 157. Such coolant airstream is particularly advantageous in connection with the present invention since it serves to partially cool and set the unlaminated web edges 101A, 101B while they are still physically held apart by the left and right separator rods 167, 168. As will be appreciated upon comparison of FIGS. 15 and 21, fan 171 provides an upstream portion of the cooling station 170 which here overlaps the downstream portion of the laminating station 150.

Although not shown in detail in the drawings, those skilled in the art will appreciate that conventional laminators of the type shown diagrammatically at 158 in the drawings will commonly include a motor and suitable power drive means for synchronously driving the pairs of rolls 154, 155 and 156, 157 in contra-rotating directions—that is, rolls 154 and 156 (as viewed in FIG. 18) will be driven in a clockwise direction, while rolls 155, 157 will be driven at the same speed in a counterclockwise direction—thereby enabling the two sets of pressure rolls 154, 155 and 156, 157 to provide the necessary frictional force required to pull the continuous sheets 114U, 114L of polymeric material from the supply rolls 151, 152. As best illustrated in FIG. 17, and while not described herein in detail, the conventional laminator 158 also employs suitable ON/OFF control switches for each of the two heaters 162, 164, the motor for driving the pressure rolls 154, 155, 156, 157, and the fan 171 (FIG. 21) together with a suitable speed adjustment for the pressure roll driving motor (not shown).

To insure that the centrally laminated web 101 and its unlaminated edges 101A, 101B—viz., the longitudinally extending, unlaminated, unbonded edge portions of the upper and lower plies 114U, 114L of coated polymeric material—are fully cooled and set upon exit from the laminating station 150, the web is passed through th downstream portion of cooling station 170. To this end, a suitable fan 172 and cooling chamber 174 (FIG. 21) are positioned at the exit end of laminator 158 immediately below a longitudinally extending table 175 having its discharge end adjacent a storage hopper 176 or, if desired, adjacent a conventional take-up reel (not shown).

Figure 21:
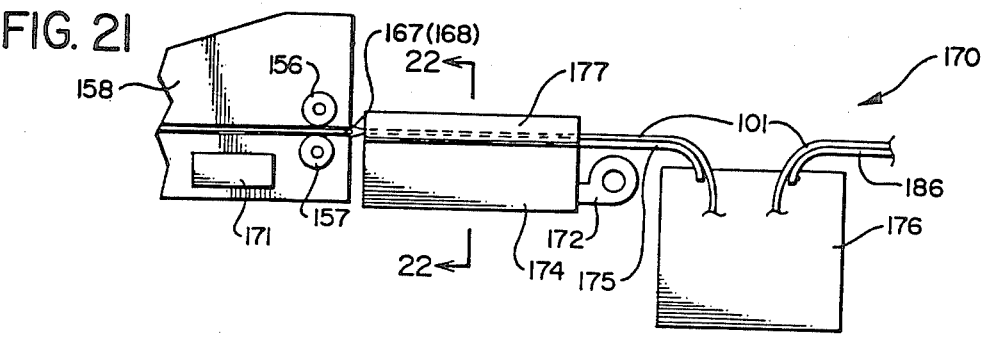
FIG. 21 is a fragmentary side elevational view depicting the cooling systems of the present invention incorporated in, and at the output side of, the laminator.
Figure 22:
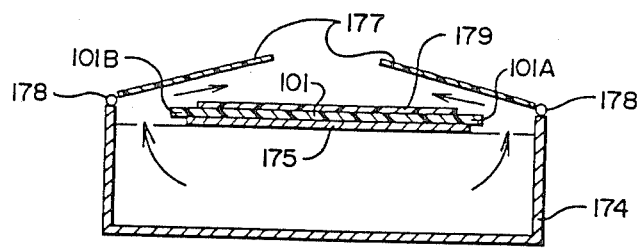
FIG. 22 is a sectional view taken substantially along the line 22—22 in FIG. 21, here illustrating further details of the edge cooling system for the centrally laminated polymeric web.

As best shown by reference to FIGS. 21 and 22 conjointly, table 175 serves to support the centrally laminated web 101 as it exits from laminator 158 and is preferably dimensioned such that it is approximately as wide as the laminated central portion of the web—viz., the unlaminated longitudinal edges 101A, 101B of web 101 extend laterally beyond the edges of table 175. As a consequence of the foregoing arrangement, cooling air delivered to chamber 174 by fan 172 moves upward, around and over the laterally projecting edges 101A, 101B of web 101 as indicated by the arrows in FIG. 22. Air deflection panels 177 hingedly connected to the upper portion of the sides of chamber 174 extend partially over the web and serve to insure complete and adequate cooling and setting of the unlaminated web edges 101A, 101B. A relatively thick, rigid, plastic sheet 179 is hingedly connected to the laminator 158 in any suitable manner (not shown) and extends in a downstream direction in overlying relation to the web 101 as the latter passes through the downstream portion of the cooling station 170. The arrangement is such that sheet 179 serves to maintain the web 101 flush with the table 175 and to prevent chattering of the web resulting from the flow of cooling air. The thus cooled and set web may then be deposited in the hopper 176 (FIG. 21) or stored on a suitable take-up reel (not shown) while awaiting further processing or, alternatively, it may be fed directly into the first edge forming station 180 (FIG. 15).

C. First Edge Forming Station 180

Figure 41:
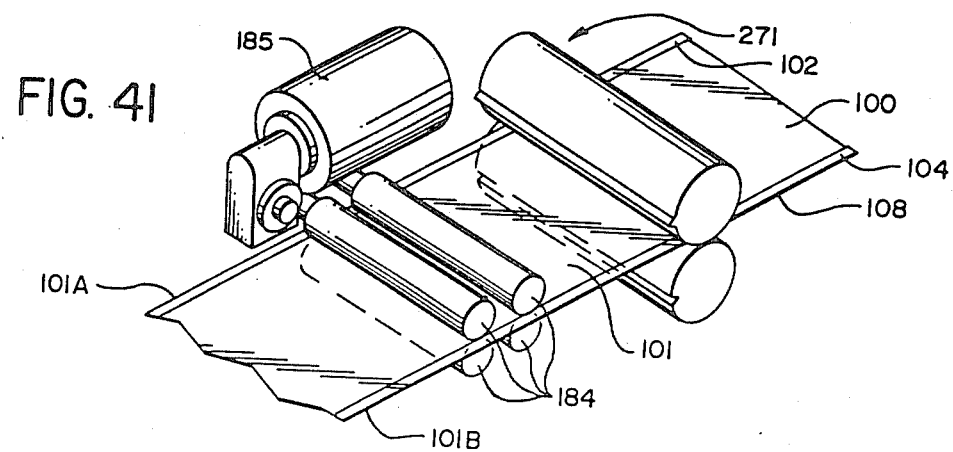
FIG. 41 is a fragmentary perspective view illustrating the polymeric web feeding mechanism and an exemplary cutter mechanism for subdividing the now formed continuous web into discrete identical file pockets of the type shown in FIG. 7.

Turning next to FIGS. 23 through 26, there has been illustrated exemplary apparatus for initially bending the unlaminated longitudinal edges 101A, 101B of the continuous laminar central web 101 to form front and back, lower and upper pocket tips 102 through 105 for the file pocket 100 shown in FIG. 7. Thus, as here shown, the laminar central web 101 is drawn from the hopper 176 (FIG. 21) at the output end of the laminator 158, or from any suitable take-up reel (not shown), by means of power driven rollers 184 (FIGS. 15 and 41) disposed at the downstream end of the in-line file pocket production system 140 (FIG. 15) wherein the rollers 184 define nips frictionally engaged with the continuous web 101 and are driven by any suitable power source such, for example, as motor 185. As the web 101 is withdrawn from the hopper 176 and moves through the sequential edge forming stations 180, 200, 220 and 230, it is supported on a longitudinally extending table 186 (see, e.g., FIGS. 21, 24 and 25) which preferably has a transverse width at each edge forming location which is approximately equal to the laminated central portion of the web 101—i.e., the unlaminated edges 101A, 101B, at least during the initial forming stages, extend laterally beyond the longitudinal edges of the table 186.

Figure 24:
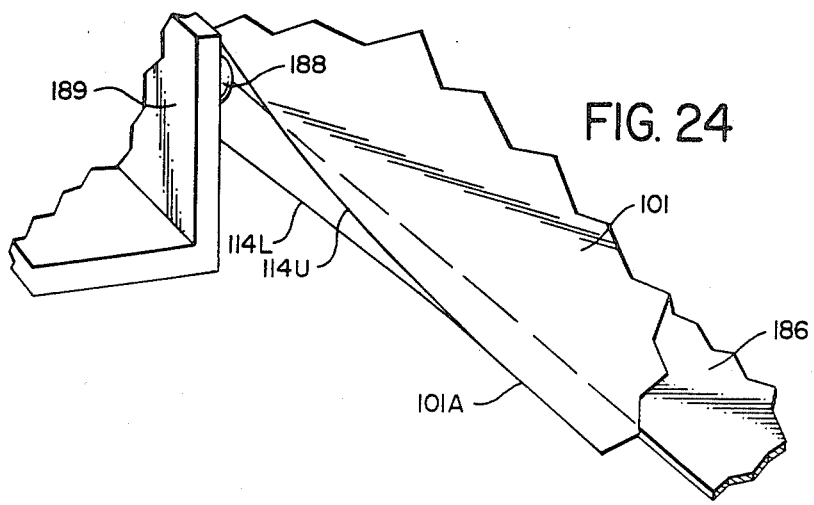
FIG. 24 is a fragmentary perspective view here illustrating the spreading of one unlaminated edge of the centrally laminated polymeric web as the latter is fed into the forming station so as to form an essentially T-shaped edge configuration, it being understood that a similar edge spreading mechanism is employed for spreading the opposite unlaminated edge of the web.

In order to bend the unlaminated longitudinal edge portions 101A, 101B of the upper and lower polymeric sheets 114U, 114L through angles of 90° with those unlaminated edge portions defined by tne upper sheet 114U being bent upwardly out of the plane of the web 101 through 90° angles and those unlaminated edge portions defined by the lower polymeric sheet 114L being bent downwardly out of the plane of the web 101 through 90° angles to form T-shaped edges 181L, 181R as shown in FIG. 16c, the illustrative first edge forming station 180 includes left and right shaped splitter or spreader blocks formed of suitable plastic material such, for example, as Delrin, Teflon, or the like, the left one of which is depicted at 188 in FIG. 24. Such shaped splitter or spreader blocks 188 are supported on the frame 189 of the apparatus outboard of the web 101 on each side thereof. As the web 101 is drawn between the left and right shaped spreader blocks 188, the latter serve to separate the upper and lower polymeric plies defining the unlaminated edge portions 101A, 101B with those edge portions defined by the upper polymeric sheet or ply 114U being bent upwardly and those edge portions defined by the lower polymeric sheet or ply 114U being bent downwardly.

Figure 25:
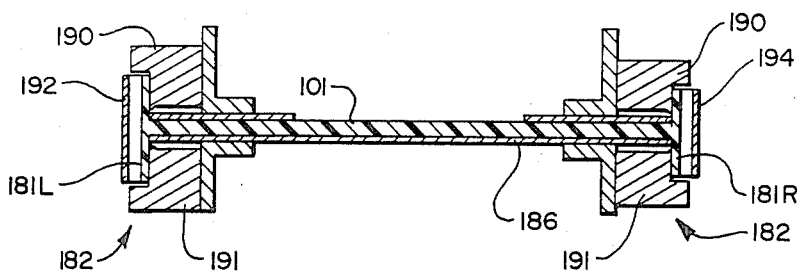
FIG. 25 is a sectional view taken substantially along the line 25—25 in FIG. 23, here illustrating the shaping means employed for bending the partially spread unlaminated edges of the laminar polymeric web into T-shaped configurations.
Figure 26:
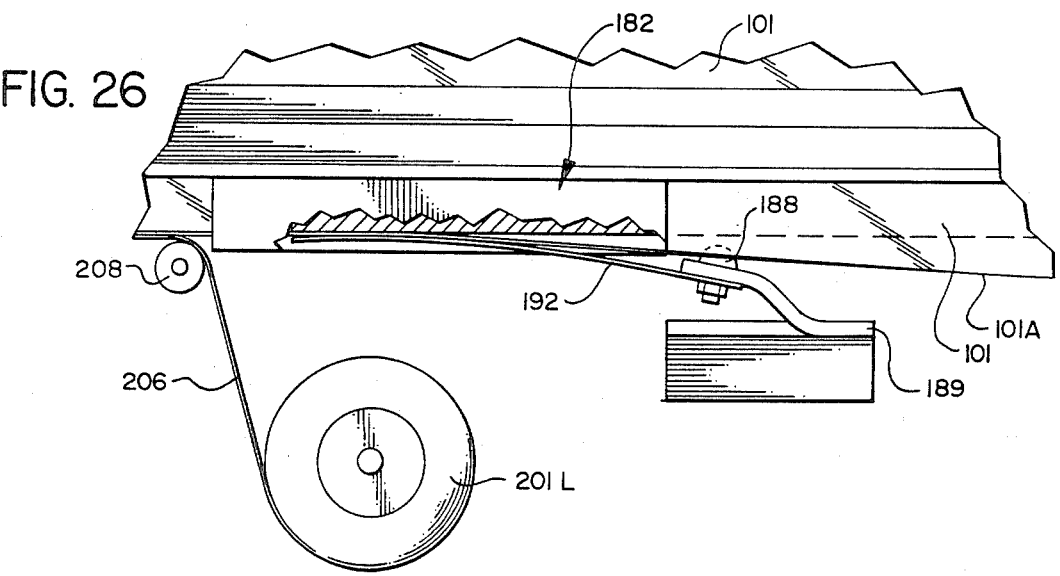
FIG. 26 is an enlarged fragmentary plan view of the left-hand portion of the forming station shown in FIGS. 23 and 25, here illustrating further details of that portion of the system for bending the partially spread left unlaminated edges of the laminar polymeric web into a T-shaped configuration.

To complete the initial stages of edge formation so as to produce a continuous laminar web 101 having T-shaped edges 181L, 181R of the type shown in FIG. 16c, the partially spread unlaminated edges enter a pair of left and right heated guide channels, generally indicated at 182 in FIGS. 15, 23, 25 and 26. As best shown in FIG. 25, each heated guide channel 182 is defined by upper and lower heaters 190, 191 which are shaped to provide a relatively sharp, longitudinally extending edge immediately above and immediately below the juncture between the unlaminated edge portion 101A and the centrally laminated web 101 so that as the unlaminated edge plies are progressively bent towards positions normal to the plane of the centrally laminated web 101, sharp, right angular bends are produced; and, consequently, the upper and lower unlaminated polymeric edges assume a T-shaped configuration in which the upwardly and downwardly right angular bent edges are flush with the vertical faces of heaters 190, 191, with the polyester sheet material 115 (FIG. 16c) in face-to-face contact with the heater faces and the heat-bondable polyethylene coating 116 facing outwardly. To insure complete and proper bending of the polymeric materials, a pair of flat, spring steel members 192, 194 are mounted on the frame 189 of the apparatus and serve to bias the bent longitudinal edges into face-to-face engagement with the vertical faces of heaters 190, 191. The spring steel biasing members 192, 194 are preferably dimensioned to provide top-to-bottom biasing contact over the entire vertical extent of the T-shaped edges 181L, 181R; and, further, are preferably Teflon coated so as to minimize removal of softened polyethylene from the outwardly presented faces of the coated polymeric T-shaped edges 181L, 181R.

Those skilled in the art will appreciate that where the system 140 (FIG. 15) herein described is designed to form lower pocket tips 102, 103 (FIG. 7) on the order of 15/32 inch in internal depth, the corresponding T-shaped edge from which those pocket tips are to be formed—here, edge 181L—will be approximately 5/16 inch in height as measured from top to bottom in FIG. 25; such T-shaped edge 181L having been formed by upward and downward bending of a 15/32 inch wide unlaminated dual ply edge 101A. Similarly, the opposite T-shaped edge—here, edge 181R—will be approximately $\frac{3}{4}$ inch in height as measured from top to bottom in FIG. 25; such T-shaped edge having been formed by upward and downward bending of a $\frac{3}{8}$ inch wide unlaminated dual ply edge 101B. The upper pocket tips (e.g., tips 104, 105 in FIG. 7) formed from edge 181R will, in the assumed case, be on the order of only about $\frac{3}{8}$ inch in internal depth.

Thus, the arrangement is such that the continuous laminar web 101 exiting from the first edge forming station 180 will be characterized by a unitary double-ply integral central laminar web 101 having left and right T-shaped edges 181A, 181B defined by sharp, right angular bends of the unlaminated edges of upper and lower plies of polymeric material, with each T-shaped edge dimensioned to produce front and back pocket tips 102 through 105 (FIG. 7) of a desired depth. The heaters 190, 191 will have effectively preheated and preconditioned the outwardly presented heat-bondable polyethylene film 116 on each T-shaped edge for subsequent lamination thereof to separate left and right coated polymeric ribbons 201L, 201R as the web traverses the second edge forming station 200 (FIG. 15).

D. Second Edge Forming Station 200

As the centrally laminated continuous web 101 and its opposed longitudinally extending T-shaped edges 181L, 181R exit from the first edge forming station 180 and enter the second edge forming station 200, provision is made for heat bonding ribbons 201L, 201R of coated polymeric material to the previously formed T-shaped edges 181L, 181R, respectively, while providing sufficient excess ribbon width as contrasted with the height of the T-shaped edges to: (i) accommodate subsequent bending of the laminated ribbons and T-shaped edges through additional angles of 90° while maintaining the longitudinally extending ribbon edges and the free ends of the longitudinally extending T-shaped edges in edge-to-edge relation—i.e., when fully bent, the T-shaped edges define the inner lamination of the formed pocket tips while the ribbon material defines the outer lamination thereof and, consequently, the total length of the outer lamination defined by the ribbon width must be somewhat greater than that of the inner lamination; and ii), permit formation of a hinge pin receiving bore 109 (FIG. 7) in that particular longitudinal edge—here, the edge 181R—from which the upper front and back pocket tips 104, 105 (FIG. 7) are to be formed. To this end, and as best illustrated by reference to FIGS. 23 and, especially, 27 through 30, conjointly, coils or spools of coated polymeric materials in ribbon form 201L, 201R are provided wherein ribbon 201L has, in the exemplary case here being described, a width of 1 inch while ribbon 201R has a width of 15/16 inch—and, both ribbons include a ribbon-like sheet face 205 formed of polyester material 7 mils in thickness and an opposed face 206 formed of heat-bondable polyethylene 3 mils in thickness.

Figure 23:
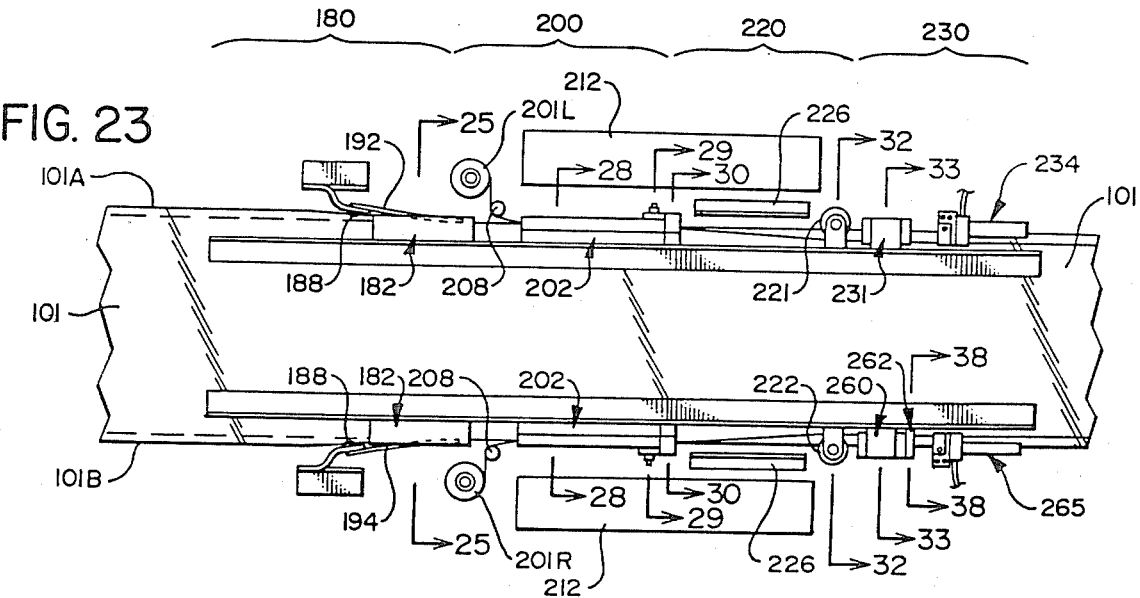
FIG. 23 is a plan view of that portion of the file pocket forming system of the present invention employed for bending, shaping and forming the continuous front and back pocket tips along both unlaminated edges of the laminar polymeric web, and for simultaneously forming a hinge pin receiving bore along one edge thereof, so as to produce file pockets of the type shown in FIG. 7.

Referring to FIGS. 23 and 27, it will be noted that the ribbons 201L, 201R are wrapped partially around guideposts 208 and fed into and through the left and right guide channels 202 in generally face-to-face relation with the respective T-shaped edges 181L, 181R on web 101. However, and considering first that portion of the second edge forming station 200 intended to operate on the left T-shaped edge 181L of web 101, it will be recalled that the left T-shaped edge has a total vertical height of approximately 15/16 inch whereas the left ribbon 201L has a width—i.e., a vertical height as viewed in the drawings—of 1 inch. That is, there is a 1/16 inch height differential therebetween. In this exemplary case, the left guide channel 202 is defined by upper and lower brackets 209, 210 mounted on the frame 189 of the apparatus and shaped to define an outwardly facing C-shaped guide channel 202 having a vertical height of 15/16 inch—i.e., the same height as T-shaped edge 181L and a 1/16 inch lesser height than ribbon 201L. The brackets 209, 210 are spaced slightly apart to permit the support table 186 and continuous web 101 supported thereon to project laterally through brackets 209, 210 with the T-shaped edge 181L received in flush face-to-face relation with the vertical faces of the C-shaped guide channel. Since ribbon 201L is 1/16 inch wider than the vertical channel height, it is bowed slightly outward, as best viewed in FIGS. 16d and 28, with its upper and lower longitudinal edges aligned with the upper and lower free ends of the longitudinally extending T-shaped edge 181L; thus defining a gap 204L therebetween. To insure retention of the ribbon 201L within the guide channel 202 in the proper bowed configuration, a suitably shaped guide pin 211 (FIG. 27) is provided.

In carrying out the invention to form file pockets 100 having the previously assumed dimensions, the right portion of the second edge forming station 200 (FIG. 15) which is best illustrated by reference to FIGS. 15, 23 and 28, conjointly, is essentially identical to the left portion described above—except, that in this instance the upper and lower brackets 209', 210' defining the right C-shaped guide channel 202 are shaped to receive the right T-shaped edge 181R on web 101 where such edge, in the exemplary case, is $\frac{3}{4}$ inch in height and, consequently, the right C-shaped guide channel 202 has a height of only $\frac{3}{4}$ inch as contrasted with the height of the left C-shaped guide channel 202 which is 15/16 inch in height. Further, the right ribbon 201R is 15/16 inch wide; and, consequently, the gap 204R defined between the right ribbon 201R and the right T-shaped edge 181R is considerably larger than the left gap 204L because the differential in height between the right ribbon 201R and its adjacent right T-shaped edge 181R is 3/16 inch while the differential at the left edge between the T-shaped edge 181L and ribbon 201L is only 1/16 inch.

As the centrally laminated continuous web 101, its T-shaped edges 181L, 181R and ribbons 201L, 201R traverse the left and right C-shaped guide channels 202, they are subjected to heat generated by any suitable heat source such, for example, as an infrared heater 212 disposed outboard of the left and right channels 202 and extending downstream therefrom into the third edge forming station 220. Consequently, such heater serves to heat the coated ribbons 201L, 201R and the coated T-shaped edges 181L, 181R which have their heat-bondable polyethylene coated surface films 206, 116 in facing relation, thereby heating and softening the polyethylene coatings preparatory to the application of laminating pressure thereto.

As best illustrated by reference to FIGS. 23 and 29 conjointly, it will be noted that as the web 101 and its thus heated T-shaped edges 181L, 181R together with the heated ribbons 201L, 201R approach the exit end of the C-shaped guide channels 202, two pairs of adjustable threaded elements 212U, 212L and 214U, 214L carried by the frame 189 of the apparatus adjacent the left and right edges thereof serve to bend the upper and lower longitudinally extending edges of the left and right ribbons 201L, 201R inwardly into face-to-face contact with T-shaped edges 181L, 181R; thereby forming and shaping the longitudinally extending gaps 204L, 204R therebetween and simultaneously applying a heat-sealing effective laminating pressure thereto. The degree of heat-sealing effective pressure applied may be readily controlled by adjustment of the threaded fasteners 212U, 212L, 214U, 214L.

To insure intimate face-to-face bonding and adequate heat sealing between the ribbons 201L, 201R and their adjacent T-shaped edges 181L, 181R, a further heat-sealing effective pressure may be applied thereto downstream of the threaded elements shown in FIG. 29 and at the exit end of the left and right C-shaped guide channels 202, as best illustrated by reference to FIGS. 23 and 30 conjointly. Thus, as here shown, left and right pressure applying means are provided comprising a laterally adjustable pressure plate 215 having vertically spaced silicon foam rubber blocks 216 with inwardly presented Teflon slides 218 wrapped about the foam rubber blocks 216 and in face-to-face engagement with the upper and lower longitudinally extending surfaces of the left and right ribbons 201L, 201R immediately above and below the left and right gaps 204L, 204R. A suitable heat-sealing effective pressure may be applied to the left and right pressure plates by any conventional means well known to those skilled in the art and, therefore, not shown in the drawings nor further described herein.

Thus, as the web 101 and its T-shaped edges 181L, 181R exit from the second forming station 200 (FIG.

15), left and right coated polymeric ribbons 201L, 201R are respectively heat bonded thereto in edge-to-edge alignment and defining longitudinally extending left and right gaps 204L, 204R wherein the right gap is considerably larger than is the left gap.

E. Third Edge Forming Station 220

For the purpose of initiating further bending of the now partially laminated ribbons 201L, 201R and their associated T-shaped edges 181L, 181R, respectively, through additional angles of about 90° so as to form overlying (front) and underlying (back) pocket tip-defining elements along both longitudinal edges 101A, 101B of the continuous centrally laminated web 101, the polymeric components exiting from the second edge forming station 200 are passed through a third edge forming station 220 (FIGS. 15 and 23), details of which are more fully shown by reference to FIGS. 23, 31 and 32 conjointly. Thus, at this stage in the edge forming process, the forming system 140 includes a pair of left and right grooved rollers 221, 222 which are mounted on the frame 189 of the apparatus several inches downstream of the exit end of the left and right C-shaped guide channels 202 disposed in the second edge forming station 200. As best shown in FIG. 32, the grooved rollers 221, 222 are mounted for rotation in the horizontal plane containing the continuous centrally laminated web 101 with their respective root portions 224, 225 in contact with the polyester faces 205 of the left and right ribbons 201L, 201R at the longitudinally extending centerlines of the partially laminated ribbons 201L, 201R and T-shaped edges 181L, 181R—i.e., the left and right gaps 204L, 204R and the bounding central portions of the left and right ribbons 201L, 201R are received within the root portions 224, 225 of the grooved rollers 221, 222 with the upper and lower large diameter edges of the rollers projecting over and under the lateral edges of table 186 and the laminar central portion of web 101.

As a consequence of the foregoing construction, as the web 101 is pulled through the third edge forming station 220, the grooved rollers 221, 222 serve to bend the upper and lower halves of the partially bonded, vertically upright, laminated ribbon/T-shaped edge combinations 201L/181L and 201R/181R inwardly towards the longitudinal centerline of web 101, and in overlying and underlying relation to the centrally laminated portion of web 101. Because the left gap 204L resulting from the 1/16 inch differential height between ribbon 201L and edge 181L is initially quite small and, since the ribbon 201L constitutes the outer lamination of the now U-shaped (see, FIG. 32) ribbon/T-shaped edge combination 201L/181L, the gap 204L tends to get progressively smaller as air is expressed rearwardly thereof along the gap and the parts are folded over. During this stage of the edge forming operation, a lesser degree of heat is required and, consequently, one or more L-shaped heat baffles 226 (FIG. 23) may be positioned between the longitudinal web edges 101A, 101B and the infrared heaters 212. Alternatively, separate infrared heaters (not shown) or the like may be employed which can be either temperature adjustable or movable laterally relative to the polymeric materials passing through the third edge forming station 220.

F. Fourth Edge Forming Station 230

Turning now to FIGS. 15, 23, and 33 through 40, there will hereinbelow be described an exemplary sequence of final edge forming and shaping steps as might be simultaneously employed to form front and back, lower and upper pocket tips 102 through 105 (FIG. 7) on a file pocket 100 wherein the pocket tips have particular desired cross-sectional profiles and/or configurations. For convenience, the ensuing description will first treat the final edge forming operations carried out in the fourth edge forming station 230 at the left edge 101A of the continuous laminar web 101 and from which the lower front (upper as viewed in FIGS. 33, 36, 38 and 40) and back (lower as viewed in the drawings) pocket tips 102, 103 are formed. Thereafter, the sequence of final right edge forming steps will be described, it being understood that somewhat similar final left and right edge forming steps carried on in the fourth edge forming station 230 are being carried out simultaneously.

Thus, referring first to FIGS. 15, 23 and 33, it will be observed that the generally U-shaped partially turned over left ribbon/T-shaped edge combination 201L/181L exiting from the third edge forming station 220 is first passed through a heater element 231 having a generally rectangular, longitudinally extending, slot 232 formed therein and sized to receive the fully folded over left ribbon/T-shaped edge combination 201L/181L wherein the folded over edges lie in planes generally parallel to the centrally laminated continuous web 101. In keeping with this aspect of the invention, and as best illustrated by reference to FIGS. 33 and 34 conjointly, it will be observed that the vertical wall of heater 231 defining the base of slot 232 formed therein is formed at an oblique angle converging towards the folded over polymeric components as they move progressively towards the downstream end of heater 231—i.e., slot 232 gets progressively shallower in a downstream direction. Thus, the arrangement is such that the left gap 204L is progressively decreased in size as the components traverse heater 231 with air entrapped therein being expressed rearwardly along the gap; and, when the materials exit from the downstream end of the heater 231, the ribbon 201L and now folded over T-shaped edge 181L are in mutually coextensive face-to-face relation essentially devoid of any gap.

Upon exiting from heater 231, the fully folded left ribbon/T-shaped edge combination 201L/181L is passed into a file pocket profile control assembly, generally indicated at 234 in FIGS. 15 and 23. Such profile control assembly 234 is here defined by: (i) a specially shaped edge configuration for support table 186; (ii) a vertically spaced, complementally shaped upper plate 235; (iii) a generally U-shaped outer die assembly, generally indicated at 236 in FIG. 36; and (iv), downstream cooling and final shaping means. Thus, as best shown in FIG. 236, it will be noted that the left edge of table 186 and the vertically spaced parallel upper plate 235 carried by the frame 189 of the apparatus define a relatively narrow—approximately 10 mils—slot 238 through which the laminated web 101 is pulled by rollers 184 (FIGS. 15 and 1); such slot being dimensioned to maintain the web in a flat, horizontal position. Moreover, the outer end of both the table 186 and plate 235 are provided with smooth, longitudinally extending, generally curved, thickened portions 239, 240 terminating at their longitudinally extending inner portions in longitudinally extending reduced thickness areas 241, 242, with such reduced thickness areas 241, 242 lying slightly outboard of the free inboard ends of the turned over ribbon/T-shaped edge combination 201L/181L. The generally U-shaped outer die assembly 236 includes horizontally extending lower and upper complementally shaped Teflon blades 244, 245 spaced apart by an intermediate Teflon plate 246 and held in surrounding shaping relation to the polymeric edge materials by means of lower and upper pressure plates 248, 249 and intermediate silicon foam rubber pads 250, 251, with the entire assembly 236 being carried by the frame 189 of the apparatus.

Thus, the arrangement is such that as the laminar web 101 and the fully turned over ribbon/T-shaped edge combination 201L/181L traverse the upstream end of profile control assembly 234, the folded over laminar ribbon/edge combination 201L/181L tends to form a smoothly curved, somewhat flattened, teardrop configuration having longitudinally extending free edges which tend to flare slightly away from the central laminar web 101.

Finally, as the thus formed left edge of the laminar central web 101 exits from die assembly 236 comprising the upstream portion of profile control assembly 234, the polymeric components are passed successively through a cooling area 252 (where they are subjected to coolant airstreams exiting from air nozzles 254a, 254b, 254c which are respectively coupled to any suitable conventional source of coolant air—not shown—via conduit 255, as best shown in FIGS. 35, 37 and 39) and a pair of longitudinally extending, vertically spaced, final shaping blocks 256, 258 (best shown in FIGS. 35, 39 and 40).

In keeping with this aspect of the invention, the shaping blocks 256, 258 are preferably formed of plastic material such, for example, as Delrin and/or Teflon, and define a progressively narrowing longitudinally extending slot 259 (FIGS. 35 and 40). Consequently, as the shaped left edge traverses slot 259, the smoothly curved, somewhat flattened, teardrop shaped edge configuration (shown more clearly in FIG. 36) tends to be further flattened as it sets, thus causing the free upper horizontal edges of the lower front and back pocket tips 102, 103 (FIG. 7) to be further flattened and set in a position wherein those portions of the pocket tips formed intermediate the reduced thickness areas 241, 242 and spring plates 244, 245 (FIG. 36) are self-biased into yieldable, compressible engagement with the intermediate laminar central web 101; yet, are provided with horizontally extending extremities flared slightly away from the laminar central web 101 to facilitate insertion of documents into the front and back lower pocket tips 102, 103. In practice it has been found that 8½ inch by 11 inch file pockets made in accordance with the invention may, for example, have an overall maximum thickness in the folded over regions of on the order of about 125 mils prior to passage through slot 259, while after passage through the slot the maximum thickness is only about 100 mils.

Considering next the sequential edge forming steps carried out along the right edge 101B of the laminar web 101, and referring first to FIGS. 15, 23 and 33 conjointly, it will be observed that a right heater element 260 having a generally rectangular, horizontally extending, slot 261 is carried by the frame 189 of the apparatus directly opposite heater 231 previously described which is located at the left edge of the apparatus. The two heaters 231, 260 are essentially identical in structure and function except that slot 261 formed in heater 260 remains of constant depth as the materials move longitudinally therethrough—as contrasted with slot 232 in heater 231 which, as previously described, gets progressively shallower so as to express air entrapped in left gap 204L out of the gap, thereby eliminating the gap and forming a mutually coextensive face-to-face bond between the left ribbon 201L and the T-shaped edge 181L. On the right edge, however, the somewhat enlarged gap 204R is intended to function as a hinge pin receiving bore 109 (FIG. 7); and, consequently, no provision is made for expressing the air from the right gap 204R and eliminating the same.

In some instances, it may be desirable to form special edge configurations along the upper horizontal edge 108 of file pockets 100 of the type shown in FIG. 7. An arrangement for forming one such special shaped edge configuration is disclosed in FIG. 38. Thus, as here shown, a specially shaped or contoured plate-like die element 262 is provided for forming a sharply rounded longitudinally extending hump 264 coextensive with the upper longitudinal edge defined by the right ribbon 201R and folded over T-shaped edge 181R with the hump 264 substantially surrounding and enclosing the hinge pin receiving bore 109 (FIG. 7) defined by the right gap 204R.

Those skilled in the art will appreciate that as the right edge of the web 201 exits from the right heater 260 and/or the specially contoured plate-like die 262 (where such a die is provided), it is sequentially passed through a profile control assembly, generally indicated at 265, which for all intents and purposes, may be substantially identical to the profile control assembly 234 previously described which operates on the left edge of the web 101. Those skilled in the art will, of course, appreciate that minor dimensional differences will be provided in the right profile control assembly 265 as contrasted with the left profile control assembly 234 to accommodate the slightly differently dimensioned lower and upper pocket tips 102, 103 and 104, 105. For example, while longitudinally extending Teflon and/or Delrin blocks similar to blocks 256, 258 shown in FIG. 40 would also be included in the right edge profile control assembly 265, it will be understood that the progressively narrowing slot formed thereby—i.e., the slot corresponding to that shown at 259 in FIG. 40—would preferably be located inboard of that portion of the folded over right edge containing the longitudinally extending right gap 204R so as to insure that while the thicker portion of the pocket tip-defining components at the right edge is flattened as previously described, the extreme upper edge 108 containing the hinge pin receiving bore 109 is not flattened.

G. Web Feeding And Subdividing Station 270

Those persons skilled in the art will readily appreciate that the continuous laminar web 101 exiting from the fourth edge forming station 230 is, in effect, a file pocket approximately 8⅜ inches in height (based upon the assumed design parameters hereinabove set forth), but of a continuous length limited only by the amount of polymeric web material contained on supply rolls 151, 152 (FIG. 15). As that continuous web 101 or file pocket traverses station 270, it first passes through the frictionally engaged, power driven rollers 184 (FIGS. 15 and 41) previously described which serve to pull the web from hopper 176 (FIG. 21), or from any suitable take-up reel (not shown), progressively and sequentially through forming stations 180, 200, 220, 230 and 270. Thereafter, the continuous web 101 is passed through any conventional cutting mechanism such, for example, as that diagrammatically indicated at 271 in FIGS. 15 and 41 which serves to subdivide the continuous web into discrete file pockets 100 which, using the assumed dimensional parameters hereinabove set forth, would have a length of 11 inches.

It has been found that the particular temperatures employed at various forming stations within the overall forming system 140 (FIG. 15) will vary dependent upon a wide range of parameters such, for example, as the materials from which the file pockets are made, the thicknesses of polymeric materials employed, the dimensions of the heating elements, feed speed of the materials through the system, etc. However, when forming file pockets 100 from the exemplary materials herein described at a feed speed on the order of 3 feet/min., a suitable laminator temperature—i.e., the temperature of heaters 162, 164 in laminator 158—has been found to be about 125° F.; while heaters 190, 191 in the first edge forming station 180 are maintained at a temperature in a range of about 300° F. to about 325° F.; the temperature produced in the second and third edge forming stations 200, 220 by infrared heaters 212 is maintained at a level just below the point where the polyethylene surface film begins to boil or to visually exhibit bubble formation; and, the temperature produced in the fourth edge forming station 230 by heaters 231, 260 is maintained in the range of about 375° F. to about 425° F.

Thus, those skilled in the art will appreciate that there has hereinabove been described an exemplary file pocket forming system 140 which is capable of forming file pockets 100 of the type shown in FIG. 7 on a continuous in-line production basis. The file pockets 100 produced therein are characterized by their durability, front-to-back symmetry, and by the provision of front and back, lower and upper pocket tips 102, 103 and 104, 105 shaped to define longitudinally continuous cavities 106 devoid of separate fastening means and capable of receiving identically sized documents on both faces of the file pocket without having to form special document configurations by die cutting opera-tions or the like. Moreover, the pocket tips 102–105 are characterized by their specially selected cross-sectional profiles capable of compressibly and yieldably retaining documents captive in the file pocket 100; yet, which permit of ease of insertion of documents into the pocket tips.

Modified File Pockets Embodying Features Of The Invention

Those skilled in the art will appreciate that numerous modifications may be made to file pockets formed in accordance with the present invention without departing from the spirit and scope of the invention as expressed in the appended claims. For example, file pockets may be made which are similar to that shown at 100 in FIG. 7, but which differ dimensionally therefrom. Thus, the file pockets can be designed to accommodate documents that are 8½ inches in width by 11 inches in height; the file pockets can be designed to accommodate documents in flat, unfolded form wherein the documents are other than 8½ inches by 11 inches; the upper and lower pocket tips can be of the same depth or different depths; and, it is possible to make file pockets wherein the lower pocket tips are shallower than the upper. Indeed, it is within the scope of the invention to form front and back file pocket tips which have different depths at either or both the lower and/or upper horizontal edges. That is, the upper and lower sheets 114U, 114L of polymeric material may have different widths or, alternatively, if provided with the same width, may be laterally offset from one another so as to produce a shallow and deep lower and upper pocket tip on one face of the file pocket and a deep and shallow lower and upper pocket tip on the opposite face thereof. The polymeric sheet materials may, of course, have different thicknesses than herein described and may be formed of other suitable heat-bondable polymers. Certain of the foregoing modifications and some additional possible alternative modifications are described hereinbelow.

Figure 42:
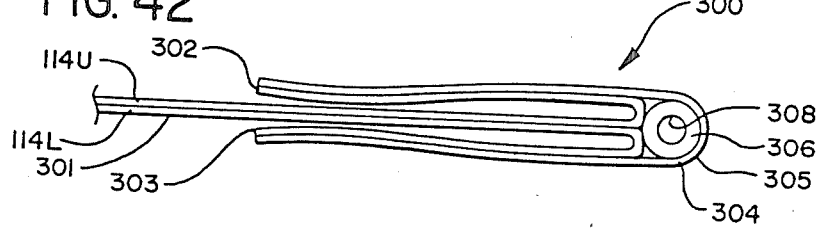
FIG. 42 is a diagrammatic fragmentary sectional view of a modified form of file pocket made in accordance with the present invention.

Referring first to FIG. 42, there has been illustrated a fragmentary portion of a modified file pocket 300 which is essentially the same as the file pocket 100 shown in FIG. 7 and which can be formed in virtually the same manner as described above. Thus, as here shown, the file pocket includes a dual ply laminar central body portion 301, front and back lower pocket tips (not shown, but which may be identical to the front and back lower pocket tips 102, 103 shown in FIG. 7 for file pocket 100), and front and back upper pocket tips 302, 303. As in the case of the file pocket 100 of FIG. 7, file pocket 300 is formed from upper and lower plies 114U, 114L of coated polymeric materials wherein the unlaminated right edge is formed into a T-shaped configuration and a relatively wider ribbon 304 of coated polymeric material is bonded thereto in edge-to-edge aligned relation so as to produce a longitudinally extending gap suitable for defining a hinge pin receiving bore in the final product 300. However, to insure increased strength, uniformity and replicability of the hingable upper edge 305 of file pocket 300, a continuous cylindrical tube 306 defining the hinge pin receiving bore 308 is interposed between the ribbon 304 of coated polymeric material and the interim T-shaped edge formed by plies 114U, 114L in the first edge forming station 180 (FIG. 15). More specifically, and as best appreciated by reference to FIG. 23, it will be appreciated that file pocket 300 can be formed by the simple expedient of interposing the continuous cylindrical tube 306 into the nip defined by ribbon 201R (ribbon 304 in FIG. 42) and T-shaped edge 181R within the second edge forming station 200; and, of course, by suitable modification of the shapes of downstream right edge forming components to accept the modified edge configuration.

Figure 43:
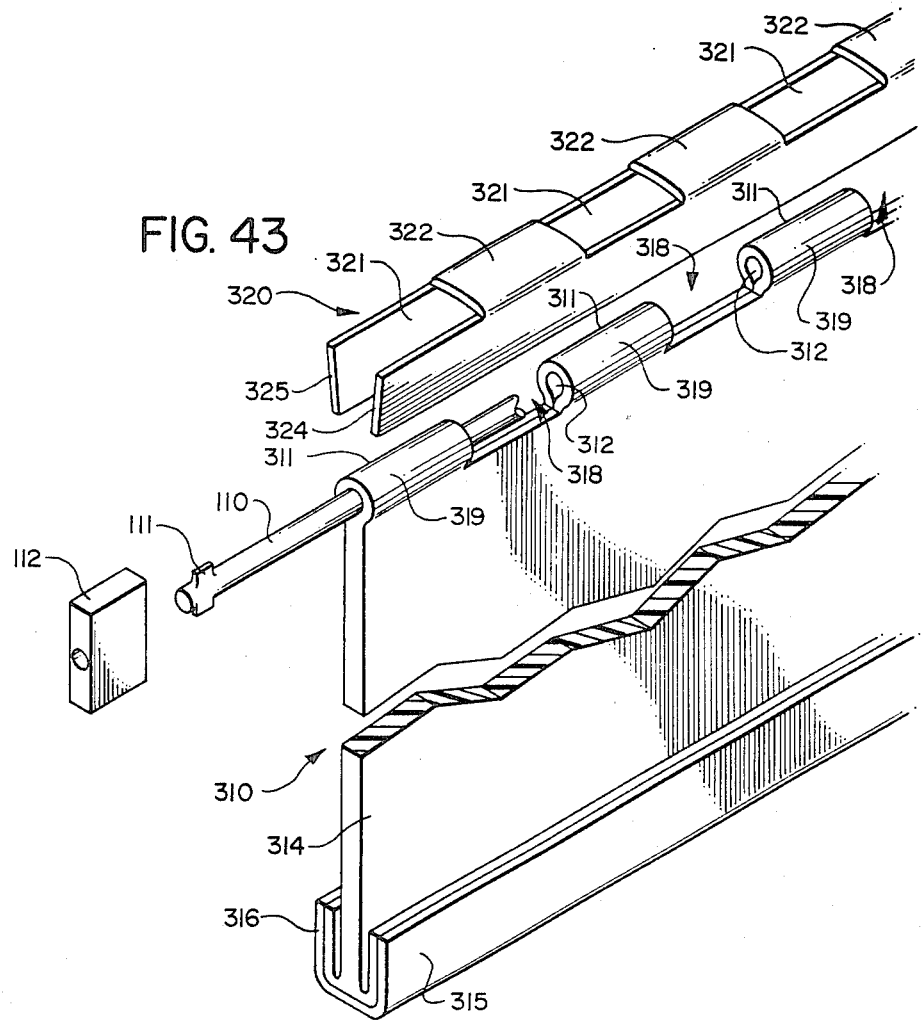
FIG. 43 is an exploded, fragmentary, perspective view of yet another form of file pocket made in accordance with the present invention.
Figure 44:
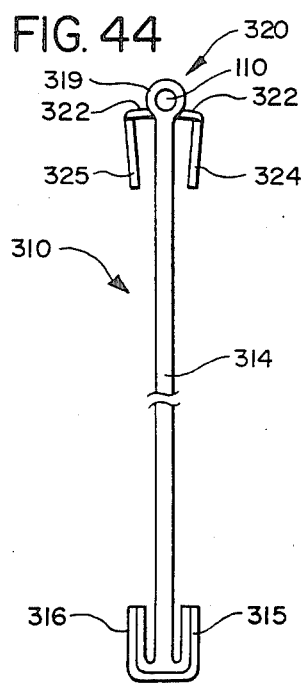
FIGS. 44 and 45 are end views of two slightly modified forms of the file pocket shown in FIG. 43.

Turning now to FIGS. 43 and 44, yet another modified form of file pocket embodying features of the invention, generally indicated at 310, has been illustrated. In this exemplary construction, the file pocket 310 is formed from a single sheet of coated polymeric material 114 of the type shown in FIG. 8 wherein the sheet 114 is folded over upon itself along a transverse line defining the file pocket's upper edge 311, preferably about a rod-like, removable, forming mandrel (not shown) capable of producing a hinge pin receiving bore 312, and with the polyethylene face of the sheet 114 of coated polymeric material being folded upon itself. The thus folded over sheet 114 is heat laminated over its central area to provide a unitary laminar central web 314 having its lower transverse edge maintained in unlaminated, unbonded form and its folded over upper edge 311 neat set in round, generally cylindrical form about the forming mandrel which is then removed. The lower unlaminated edge may then be passed through an edge forming system (not shown, but similar to that shown in FIG. 15 at stations 180, 200, 220, 230 and 270 and employing only the left edge forming equipment) so as to form front and back lower pocket tips 315, 316 in the manner previously described.

In carrying out this form of the invention, the rounded cylindrical upper edge 311 is then cut away at a plurality of longitudinally spaced areas, generally indicated at 318, to form longitudinally spaced, coaxial, cylindrical portions 319 defining an interrupted hinge pin receiving bore 312 which comprises, in effect, one-half of a piano-type hinge element. A second hinge element, generally indicated at 320, in the form of a sheet of suitable uncoated polymeric material such, for example, as polypropylene, is then die cut to form: (i) complementally shaped openings 321 adapted to receive the longitudinally spaced coaxial round hinge portions 319 on web 314; and (ii), a series of transverse bridging elements 322 adapted to fit into the cut-away areas 318 and overlie the laminar web 314 at a location immediately below the longitudinally extending interrupted hinge pin receiving bore 312. The thus die cut sheet 320 is then folded over along two parallel longitudinally extending lines generally coincident with the longitudinal edges of openings 321 and through angles slightly greater than 90°, and heat set to form a pair of depending, inwardly converging, pocket tip-defining flanges 324, 325.

The arrangement is such that the thus shaped second hinge element 320, when assembled on the web 314 with bridging elements 322 overlying the cut-away hinge regions 318, can be captively retained therein by insertion of a suitable hinge pin—for example, a hinge pin 110 identical to that shown in FIG. 7 having flatted extremities 111 formed thereon and provided with flat chip-like hinge elements 112. Thus, as best shown in FIG. 44, hinge pin 110 extends over the bridging elements 322 to retain the second hinge element 320 captive thereon with flanges 324, 325 respectively overlying the front and back faces of laminar web 314 and defining front and back pocket tips on file pocket 310.

Figure 45:
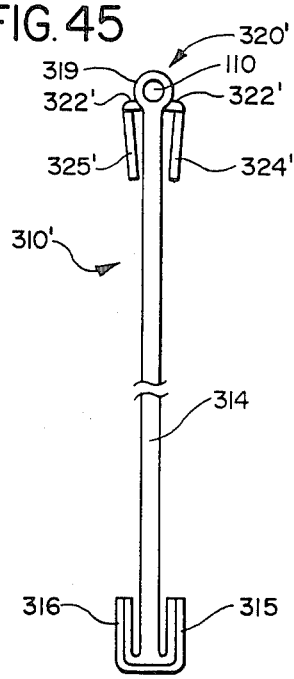

Comparing FIGS. 44 and 45, two essentially identical file pockets 310, 310' have been shown, each formed in the manner described above in connection with FIG. 43. However, it will be observed that in the file pocket 310 of FIG. 44, the bridging elements 322 of the upper hinge element 320 are considerably wider than are the bridging elements 322' of file pocket 310' shown in FIG. 45. As a consequence, the upper front and back pocket tips defined by flanges 324, 325 are capable of receiving either thicker documents and/or a greater number of documents than can be accommodated by the pocket tips defined by flanges 324', 325' on the file pocket 310' shown in FIG. 45. It will, of course, be further appreciated that while hinge pin 110 retains the two components 314 and 320 (or 320') in assembled form, nevertheless the bridging elements 322 (or 322') are free to slide back-to-front and front-to-back beneath the hinge pin 110 so that either the front or back upper pocket tip respectively defined by the flanges 324, 325 (or 324', 325') is capable of accommodating thicker and/or more documents than is the other of the two upper pocket tips. It will, of course, be understood that when forming file pockets of the type shown at 310 and 310' in FIGS. 44 and 45, respectively, the lower front and back pocket tips 315, 316 would preferably be dimensioned to readily accommodate documents of a similar thickness and/or a similar number of documents by the simple expedient of forming more rounded, less sharp, folds in the fourth edge forming station 230 (FIG. 15).

Figure 46:
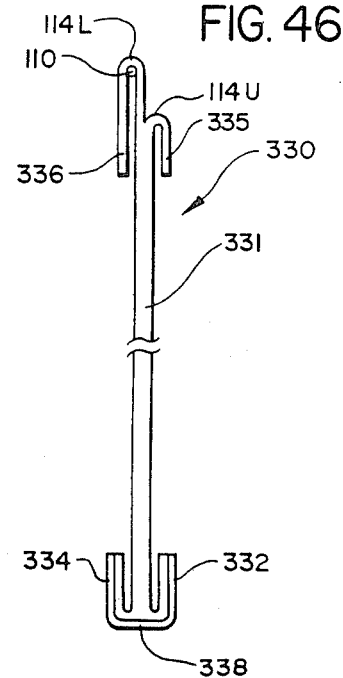
FIG. 46 is an end view similar to FIGS. 44 and 45, but here depicting a further modified file pocket construction made in accordance with the present invention.

Considering next the embodiment of the invention depicted by way of example in FIG. 46, it will be noted that the file pocket there shown, generally indicated at 330, is provided with a centrally laminated dual ply web 331 formed of two sheets of coated polymeric material 114U, 114L and having front and back lower pocket tips 332, 334 which may be identical to, and formed in the same fashion as, the web 101 and front and back lower pocket tips 102, 103 for the file pocket 100 shown in FIG. 7. However, in this instance, the sheet 114L of coated polymeric material used to form the file pocket 330 is considerably wider (width being a top to-bottom dimension as viewed in FIG. 46) than is the sheet 114U. As a consequence, the left side of the first edge forming station 180 shown in FIG. 15 would require modification so as to enable separation of the two unlaminated plies along the left longitudinal edge thereof in such a manner that the lower ply 114L is folded downwardly through an angle of 90° along a first longitudinally extending line while the upper ply 114U is folded upwardly through an angle of 90° along a second longitudinally extending line parallel to, but inboard of, the first line. Subsequent folding in the third and/or fourth edge forming stations 220, 230 (FIG. 15) would similarly be modified to provide folds about parallel longitudinally extending lines so as to form a file pocket 330 in which the back upper pocket tip 336 is considerably deeper than is the front upper pocket tip 335.

In this arrangement, the deeper back upper pocket tip 336 can readily accommodate and accept a hinge pin 110 without interference with the ability of that pocket tip to receive and accept documents to be stored. Although not shown in the drawings, those skilled in the art will appreciate that the back pocket tip 336 could be heat-crimped using conventional radio frequency welding techniques or the like immediately below the location of the hinge pin 110 so as to provide a stable, tight hinge connection. Similarly, while the file pocket 330 shown in FIG. 46 employs a separate ribbon 338 of polymeric material only at the lower edge thereof in surrounding relation to the lower pocket tips 332, 334, it would be within the scope of the invention to provide a similar ribbon (not shown) at the upper edge and in surrounding relation to the folded over plies 114U, 114L defining the upper front and back pocket tips 335, 336.

Referring now to FIGS. 47 and 48 conjointly, a file pocket 340 (FIG. 48) has been illustrated which is similar in shape, outward appearance and function to the file pocket 100 of FIG. 7; but, which is here formed from a single sheet of coated polymeric material, generally indicated at 341 in FIG. 47. Thus, as here shown, the sheet 341 is folded at 342 to yield a short downwardly depending leg 344 where the outer face is the heat-bondable polyethylene face 116 (Cf., FIG. 8). A second downwardly depending leg portion 345 continues from fold 342 to form a first document-receiving face, terminating at its lower end in fold 346. From fold 346, the web continues slightly upward to form a short leg 348; and, is again folded at 349 to provide a short downwardly extending leg 350. An outer fold 351 returns the web across a leg 352 to a corresponding fold 354 leading to a short upturned leg 355. Leg 355 is folded at 356 to form a corresponding downwardly extending short leg 358 terminating at a lower fold 359. The web then rises along an extended leg 360 corresponding to a second document-receiving face which extends upwardly to fold 361. From fold 361, a short leg 362 proceeds downwardly to fold 364, from which the web returns upwardly via leg 365 to an upper fold 366. A bridging leg 368 extends to a corresponding fold 369 from which the web projects downwardly along leg 370 terminating coincident with the beginning of leg 344.

With a suitable rod-like metal insert or mandrel (not shown) disposed between the return leg 368 and folds 342, 361, the folded web 341 is then subjected to a heat-bonding operation where the opposed polyethylene faces are autogenously welded to yield the unitary document file pocket 340 shown in FIG. 48. Thus, the bonded, finished member is comprised of a generally rectangular laminated central web 371 having a lower edge 372 defined by leg 352 (FIG. 47) from which project front and back pocket tips 374, 375. Likewise, the upper edge 376 of the file pocket 340 defined by leg 368 (FIG. 47) includes downwardly depending front and back pocket tips 378, 379. The single ply bridge defined by the inner face of leg 368 (FIG. 47) and the upper edges of folds 342, 361 yields a hinge pin receiving bore 380 through which may be received a hinge pin 110 of the type shown in detail in FIG. 7. Thus, as with the previous embodiments of the invention, the arrangement of FIGS. 47 and 48 provides a dual ply file pocket 340 having a laminar central web 371 and front and back lower and upper pocket tips 374, 375 and 378, 379 with a hinge pin receiving bore 380 being formed along the upper edge 376 of the file pocket.

FIGS. 49 and 50 are illustrative of yet another type of file pocket, generally indicated at 381, which can be made in accordance with the present invention and which includes a pair of transverse insert pockets formed across at least one of the faces of a laminar central web 382. As the ensuing description proceeds, those skilled in the art will appreciate that the front and back upper pocket tips (only the front pocket tip 383 is visible in FIG. 50) can be formed in the manner previously described in connection with FIG. 43 or, alternatively, they can be made in accordance with the process disclosed in connection with FIG. 15—however, in this latter instance, the laminating station 150 would preferably be modified to include opposed planar heaters (not shown) which are vertically spaced apart to define a flat transversely extending slot through which the two sheets of coated polymeric material 114U, 114L are fed. Similarly, while not shown in detail, the file pocket 381 depicted in FIG. 50 would preferably include front and back lower pocket tips, the front one of which is shown at 384 in FIG. 50, which would be made in the manner previously described. However, to facilitate an understanding of the embodiment of the invention, the illustrative file pocket 381 will be described as having its upper edge 385 (FIG. 49) formed in the manner previously described in connection with the upper edge 311 of the laminar web 314 shown in FIG. 43.

Thus, referring to FIG. 49, it will be observed that a sheet of coated polymeric material, generally indicated at 386, is folded at about is midpoint along the upper fold line 385 to define front and back plies 388, 389 having their heat-bondable polyethylene faces in face-to-face relation. In this case, at least one ply—here, ply 388—is provided with a pair of angularly related slits 390 through which are disposed two metal plates 391 of generally rectangular shape and having a width dimension sufficient for the plates to be projected through the slits 390 and extend between the two plies 388, 389 to prevent heat bonding within the areas defined by the phantom lines indicated in FIGS. 49 and 50. With the metal plates 391 in place, and with the two plies 388, 389 having their polyethylene surfaces in face-to-face relation, the web is heat bonded to yield a laminar central web 382 which includes first and second pockets 392, 394, as best shown in FIG. 50. The finished file pocket 381 is thus a unitary file pocket having a pair of pockets 392, 394 formed in one face thereof and defined by the unbonded central portions between the two plies 388, 389, thereby enabling storage of relatively smaller documents within the individual pockets 392, 394. At the same time, the provision of upper and lower front and back pocket tips enables the file pocket 381 to be used for the same purposes as the file pocket 100 shown in FIG. 7.

Figure 51:
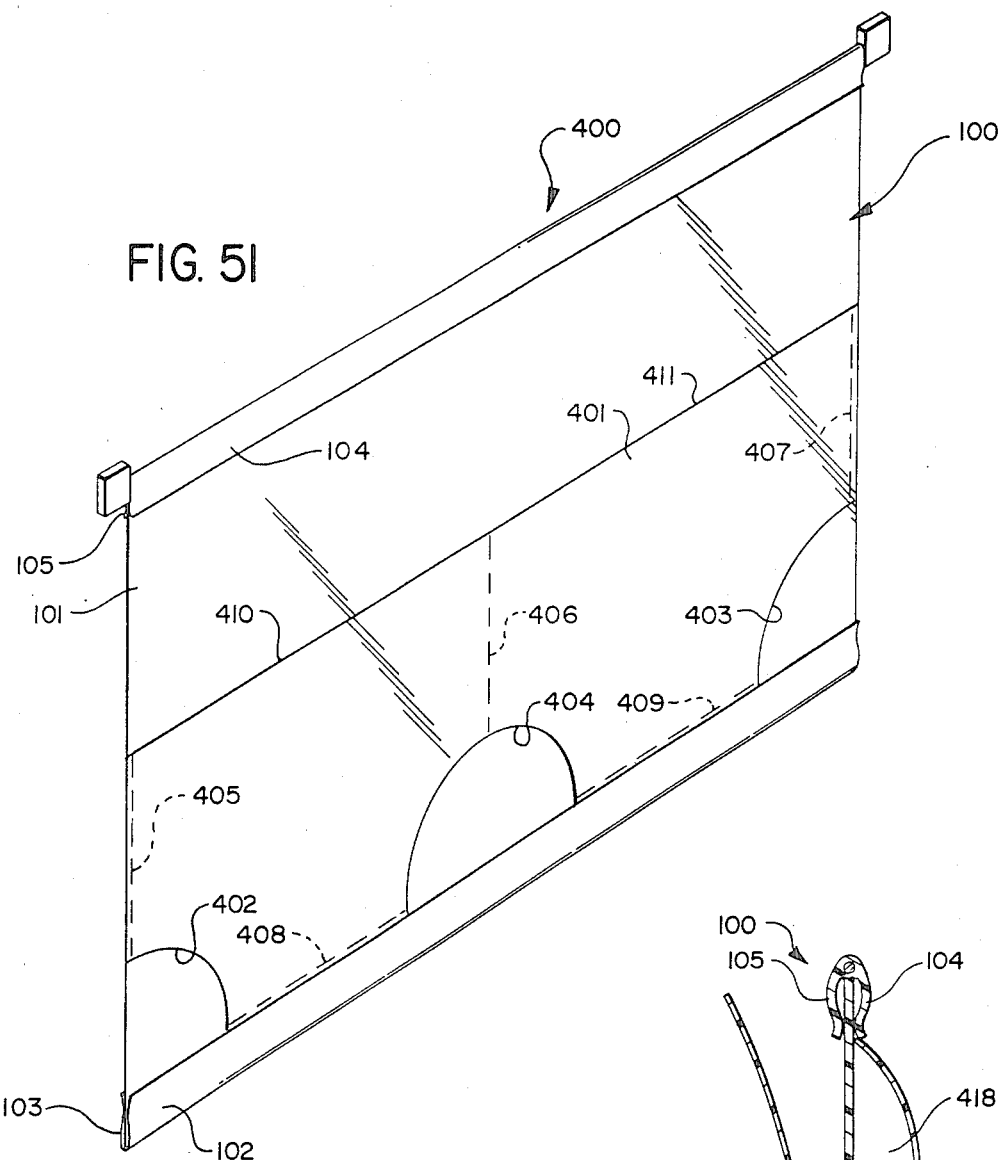
FIG. 51 is a perspective view of a plastic insert that can be employed with file pockets made in accordance with the present invention such, for example, as the file pockets shown in FIGS. 7, 42–46 and 48, for enabling storage of a plurality of documents of the same or different sizes on one or both faces of the file pocket; and, FIG. 52 is a vertical sectional view through a file pocket made in accordance with the present invention—for example, the file pocket of FIG. 7—here depicting the file pocket with front and back rectangular polymeric sheet inserts positioned in, and captively retained by, the lower front and back pocket tips and ready for insertion into the upper front and back pocket tips for forming front and back pockets each capable of holding a multiplicity of documents of the same or different sizes.

While the embodiment of the invention described hereinabove in connection with FIGS. 49 and 50 provides a file pocket 381 embodying features of the present invention which is capable of accepting, storing and displaying documents on one or both faces thereof and which have their upper and lower edges captively retained within upper and lower pocket tips 383, 384 or, alternatively, smaller documents and/or groups of documents captively retained within one or both pockets 392, 394 formed intermediate the two plies 388, 389 of polymeric material, other arrangements can be provided for accomplishing the same desired end results when using an initially unmodified version of the file pocket 100 shown in FIG. 7. Thus, referring to FIG. 51, there has been illustrated a file pocket 400 which includes as a part thereof a file pocket 100 of the type shown in FIG. 7 having front and back, lower and upper pocket tips 102 through 105. However, in this case—and again assuming an exemplary file pocket 100 of the type intended to store documents $8\frac{1}{2}$ inches high by 11 inches in width—the assembly includes a secondary pocket-defining element 401 formed of, for example, polypropylene; and, which is 11 inches in width and about 4 or 5 inches in height. Secondary pocket defining element 401 is preferably cut away along circular arcs adjacent its lower corners and at its lower middle edge, as indicated at 402, 403 and 404, to form a scalloped lower edge. The element 401 is then bonded to the exposed face(s) of file pocket 100—here, to the front face thereof—by any suitable means such, for example, as by conventional radio frequency welding techniques, with such bonding occurring along lines 405 through and including 409. As a consequence, the file pocket 400 can receive, store and display documents having widths not greater than 11 inches and heights of $8\frac{1}{2}$ inches by captively retaining the lower and upper edges of such documents in the front pocket tips 102, 104; or, alternatively, one or more documents not larger than about 5 inches by 7 inches can be inserted into secondary pockets 410 and/or 411 defined by the facing surfaces of file pocket 100 and the secondary pocket-defining element 401. A second secondary pocket-defining element such as that indicated at 401 may, of course, be bonded to back face of the file pocket 100.

Moreover, while not shown in the drawings, those skilled in the art will appreciate that two similarly shaped secondary pocket-defining elements 401 may be dimensioned slightly wider than the width of the file pocket 100, edge bonded together to form an open-ended sleeve-like structure, and then slid about the file pocket 100 with the lower edges of the thus bonded sleeve-like structure defined by two elements 401 being captively retained within the front and back lower pocket tips 102, 103 integrally formed on the pocket 100.

Figure 52:
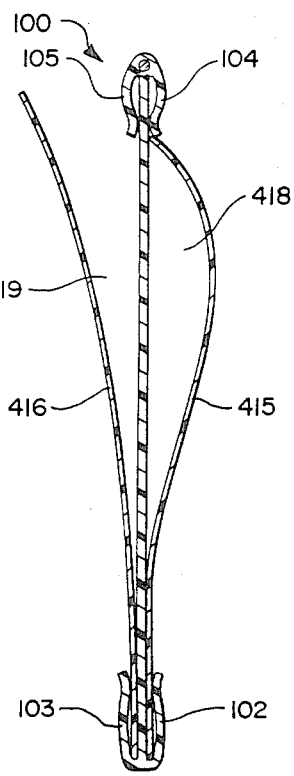

A similar, but even simpler, arrangement has been illustrated in FIG. 52. Thus, as here shown, two sheets of uncoated polymeric material such, for example, as polypropylene, here indicated at 415 and 416, are provided with each sheet preferably being dimensioned equal to that of the largest document that can be stored in the front and back lower and upper pocket tips 102 through 105 of a file pocket 100 of the type shown in FIG. 7. In this case, the lower and upper transverse edges of sheet 415 are removably inserted into, and captively retained by, the lower and upper front pocket tips 102, 104; while sheet 416 is similarly mounted in the lower and upper back pocket tips 103, 105. The arrangement is such that sheet 415 defines an accessible pocket 418 between its inner face and the front face of file pocket 100; while sheet 416 defines an accessible pocket 419 between its inner face and the back face of file pocket 100.

Accordingly, those skilled in the art will appreciate that there have herein been disclosed various visible file pockets, together with methods and apparatus for manufacturing the same, wherein the file pockets are characterized by the presence of upper and lower transversely extending integral pocket tips on both the front and back faces thereof and wherein the file pockets are totally devoid of staples or other separable fastening means extending through and obstructing the pocket tips. Rather, the pocket tips are continuous and uninterrupted on both faces of the visible file pocket and along both the upper and lower edges thereof. The resulting file pockets are characterized by their simplicity, strength and durability, as well as by their versatility. The pocket tips are characterized by their front-to-back symmetry and by their ability to captively retain documents therein; and, the file pockets readily permit of hinged mounting in document storage trays. The file pockets may, if desired, be easily modified to permit their use to support documents either singly or in groups having any desired size or sizes up to the full width and height of the overall document support faces on the file pockets.

It will be further understood by those skilled in the art that descriptive terms such as "upper", "lower", "front", "back", "top", "bottom", "left", "right", etc. have been used in the foregoing specification and the appended claims in a nonlimiting sense and merely to facilitate an understanding of the invention. For example, "lower" pocket tips 102, 103 of the file pocket 100 shown in FIG. 7—i.e., "front" lower pocket tip 102 and "back" lower pocket tip 103—will, when the file pocket 100 is rotated about its hinge pin 110 as shown in FIG. 10, become "upper" pocket tips where pocket tip 103 is now a "front" upper pocket tip and pocket tip 102 is now a "back" upper pocket tip.

What is claimed is:

1. The method of forming a generally rectangular visible file pocket of the type having first and second transverse parallel edges and at least two pocket tips defined by first and second turned over edges formed integrally with and respectively disposed on the front and back thereof adjacent at least one of the two edges, comprising the steps of:
    (a) positioning a first rectangular ply of polymeric material adjacent a second rectangular ply of polymeric material with the first and second plies of polymeric material having heat-bondable surfaces formed thereon and disposed in face-to-face relation;
    (b) applying a heat-sealing effective temperature and pressure to the first and second plies of polymeric material to form a unitary laminar central web having an unlaminated, unbonded, longitudinally extending edge portion adjacent at least one of first and second transverse parallel edges thereon and a longitudinally extending hinge pin receiving bore adjacent the other of the first and second parallel edges;
    (c) heating and folding the unlaminated longitudinally extending edge portions defined by the first and second plies of polymeric material away from one another about their longitudinally extending junction with the unitary laminar central web through angles on the order of about 180°; and,
    (d) cooling and setting the folded over, unlaminated, longitudinally extending edge portions in the folded over position to form first and second continuous, uninterrupted, longitudinally extending pocket tips respectively overlying and underlying the laminar central web along at least one of the first and second transverse parallel edges thereof.

2. The method as set forth in claim 1 wherein the heat sealing effective temperature and pressure applied in Step (b) are applied to the central portion of the first and second plies of polymeric material to form a unitary laminar central web having unlaminated, unbonded, longitudinally extending edge portions adjacent each of the first and second transverse parallel edges.

3. The method as set forth in claim 2 wherein the longitudinally extending hinge pin receiving bore is defined by one of the front and back pocket tips formed adjacent one of the first and second transverse parallel edges.

4. The method as set forth in claims 1 or 2 wherein a ribbon of heat-bondable polymeric material is applied to each transverse parallel edge having front and back pocket tips formed by folded over, unlaminated, edge portions of the first and second rectangular plies of polymeric material in face-to-face relation therewith; and, heat-bonding the ribbon to the folded over edge portions defining front and back pocket tips with the ribbon surrounding the folded over edge portions and transverse parallel edge.

5. The method as set forth in claim 2 wherein a ribbon of heat-bondable material is applied to each transverse parallel edge in face-to-face relation with the folded over edge portions of the first and second plies of polymeric material; and, heat-bonding the ribbon to the folded over plies defining front and back pocket tips with the ribbon surrounding the folded over edge portions and transverse parallel edges; and, wherein the ribbon applied to at least one transverse parallel edge has a greater width than the combined widths of the folded over edge portions and defines a longitudinally extending hinge pin receiving bore along the one transverse parallel edge intermediate the ribbon and the folded over edge portions.

6. The method as set forth in claims 1, 2 or 5 wherein the folded over edge portions are shaped to define front and back pocket tips defining a teardrop shaped profile having longitudinally extending free front and back edges flared slightly away from the laminar central web.

7. The method as set forth in claim 1 wherein the first and second plies of polymeric material are formed from a single sheet of polymeric material having a heat-bondable surface film on one face thereof which is folded over upon itself with the heat-bondable surfaces of the first and second plies disposed in face-to-face relation along a fold line defining the second transverse parallel edge and wherein the longitudinally extending hinge pin receiving bore is formed interiorly of the fold line with the bore defining folded sheet polymeric material forming a continuous, cylindrical, longitudinally extending bore.

8. The method as set forth in claim 7 wherein longitudinally spaced portions of the longitudinally extending continuous cylindrical bore are removed to form a series of longitudinally spaced, coaxial, cylindrical hinge pin receiving bores comprising one-half of a piano-type hinge element; forming a U-shaped channel having a longitudinally extending base member and a pair of longitudinally extending depending flanges; removing longitudinally spaced portions of the longitudinally extending base member to form a plurality of openings therein longitudinally spaced apart by intermediate bridging base member portions wherein the longitudinally spaced openings have a length and width sufficient to permit passage of the series of longitudinally spaced, coaxial, cylindrical hinge pin receiving bores on the second transverse edge of the laminar central web; positioning the U-shaped channel on the second transverse parallel edge with the longitudinally spaced, coaxial, cylindrical hinge pin receiving bores extending through the longitudinally spaced openings in the base member and with the bridging base member portions overlying the intermediate exposed laminar edge of the central web; and, inserting a hinge pin through the longitudinally spaced, coaxial, cylindrical hinge pin receiving bores in overlying relation to the bridging base member portions for captively retaining the U-shaped channel on the second transverse parallel edge with said pair of depending flanges defining front and back longitudinally extending, continuous, uninterrupted pocket tips.

9. The method of forming a generally rectangular visible file pocket of the type having first and second transverse parallel edges and front and back, upper and lower pocket tips respectively defined by first, second, third and fourth turned over edges formed integrally therewith and wherein the front and back lower pocket tips are adjacent the first transverse parallel edge and the front and back upper pocket tips are adjacent the second transverse parallel edge, comprising the steps of:

(a) positioning a first rectangular ply of polymeric material adjacent a second rectangular ply of polymeric material with the first and second plies of polymeric material having heat-bondable surfaces formed thereon and disposed in face-to-face relation;

(b) applying a heat-sealing effective temperature and pressure to the first and second plies of polymeric material to form a unitary laminar central web having first and second unlaminated, unbonded, longitudinally extending edge portions adjacent each of first and second transverse parallel edges thereon;

(c) heating and folding the unlaminated longitudinally extending edge portions defined by the first and second plies of polymeric material along both of the first and second transverse parallel edges away from one another about their longitudinally extending junctions with the unitary laminar central web through angles on the order of 180°; and, (d) cooling and setting the folded over, unlaminated, longitudinally extending edge portions in the folded over position to form front and back continuous, uninterrupted, longitudinally extending pocket tips overlying and underlying the laminar central web along each of the first and second transverse parallel edges thereof.

10. The method as set forth in claim 9 wherein a ribbon of heat-bondable polymeric material is applied to at least one of the first and second transverse parallel edges and is disposed in heat-bondable face-to-face relation with the folded over longitudinally extending edge portions defining the front and back pocket tips formed adjacent the at least one first and second transverse parallel edge; and, heat-bonding the ribbon to the folded over edge portions defining the front and back pocket tips with the ribbon surrounding the folded over edge portions and the at least one first and second transverse parallel edge.

11. The method as set forth in claim 9 wherein a ribbon of heat-bondable polymeric material is applied to each of the first and second transverse parallel edges in heat-bondable face-to-face relation with the folded over edge portions defining the front and back pocket tips formed adjacent the first and second transverse parallel edges; and, heat-bonding the ribbons to the folded over edge portions defining the front and back pocket tips with the ribbons surrounding the folded over edge portions and the first and second transverse parallel edges.

12. The method as set forth in claims 11 or 12 wherein each ribbon applied to a transverse parallel edge has a width greater than the combined width of the folded over edge portions adjacent that transverse parallel edge so that the longitudinally extending edges of the ribbon and the longitudinally extending free edges of the folded over edge portions are aligned in edge-to-edge relation.

13. The method as set forth in claims 11 or 12 wherein the ribbon applied to at least one transverse parallel edge has a width greater than the combined width of the folded over edge portions defining that transverse parallel edge so that (i) the longitudinally extending ribbon edges and the longitudinally extending free edges of the folded over edge portions are aligned in edge-to-edge relation and (ii) a longitudinally extending gap defining a hinge pin receiving bore is formed intermediate the longitudinally extending centerline of the ribbon and the folded over edge portions defined by the first and second plies of polymeric material.

14. The method as set forth in claims 9, 10 or 11 wherein the continuous, uninterrupted, longitudinally extending front and back pocket tips overlying and underlying the laminar central web are shaped to form a teardrop shaped profile having longitudinally extending free edges flared slightly away from the laminar central web.

15. The method as set forth in claim 12 wherein the continuous, uninterrupted, longitudinally extending front and back pocket tips overlying and underlying the laminar central web are shaped to form a teardrop shaped profile having longitudinally extending free edges flared slightly away from the laminar central web.

16. The method as set forth in claim 13 wherein the continuous, uninterrupted, longitudinally extending front and back pocket tips overlying and underlying the laminar central web are shaped to form a teardrop shaped profile having longitudinally extending free edges flared slightly away from the laminar central web.

17. The method of forming a generally rectangular visible file pocket from a single sheet of polymeric material having a heat-bondable film on one face thereof to form a laminar central web defining front and back document receiving faces and having first and second transverse parallel web edges with front and back document receiving pocket tips integral with each of the first and second transverse parallel edges and overlying the front and back document receiving faces of the web, comprising the steps of: folding the sheet along a first transverse line through an angle on the order of 180° to form a first fold line defining a first short leg and a first long leg with the heat-bondable film surfaces on the first short leg and the first long leg facing in opposite directions; folding the sheet of material defining the first long leg along a second transverse fold line through an angle on the order of 180° to form a second short leg wherein the heat-bondable film surfaces on the second short leg and the first long leg face in opposite directions; folding the sheet of material defining the second short leg along a third fold line through an angle on the order of 180° to form a third short leg overlying the second short leg in face-to-face heat-bondable relation therewith; folding the sheet of material defining the third short leg along a fourth fold line through an angle on the order of 90° and about said second 180° fold line with the sheet extending laterally beyond the first long leg; folding the laterally projecting sheet along a fifth fold line through an angle on the order of 90° to form a fourth short leg having its heat-bondable surface facing the heat-bondable surface of the first long leg and spaced therefrom; folding the sheet defining the fourth short leg along a sixth fold line through an angle on the order of 180° and defining a fifth short leg intermediate the fourth short leg and the first long leg and having its heat-bondable surface in face-to-face relation with the heat-bondable surface of the fourth short leg; folding the sheet defining the fifth short leg along a seventh fold line through an angle on the order of 180° at a point inwardly of the fifth 90° fold line and adjacent the second 180° fold line to form a second long leg adjacent the first long leg with the first and second long legs having their heat-bondable surfaces in face-to-face relation; folding the sheet defining the second long leg along an eighth fold line through an angle on the order of 180° adjacent the first 180° fold line and extending in the opposite direction to form a sixth short leg on the opposite side of the first and second long legs with respect to the first short leg; folding the sheet defining the sixth short leg along a ninth fold line through an angle on the order of 180° to form a seventh short leg wherein the heat-bondable surfaces of the sixth and seventh short legs are in face-to-face relation; folding the sheet defining the seventh short leg along a tenth fold line through an angle on the order of 90° with the sheet being wrapped about and extending over and beyond the eighth fold line; folding the laterally extending portion of the sheet along an eleventh fold line through an angle on the order of 90° about the first 180° fold line to form an eighth short leg having its heat-bondable surface disposed in face-to-face relation with the heat-bondable surface of the first short leg and terminating in end-to-end aligned relation with the free end of the first short leg; heat-bonding the first and second long legs together to form a rectangular laminar central web having a first transverse edge adjacent the first and eighth fold lines and a second transverse edge adjacent the second and seventh fold lines with the first and second transverse edges being parallel; heat-bonding the second and third short legs to form a front pocket tip along the second transverse parallel edge; heat-bonding the fourth and fifth short legs to form a back pocket tip along the second transverse edge; heat-bonding the sixth and seventh short legs to form a second back pocket tip along the first transverse edge; and, heat-bonding the first and eighth short legs to form a front pocket tip along the second transverse parallel edge.

18. The method as set forth in claim 17 wherein that portion of the sheet of polymeric material intermediate the tenth and eleventh fold lines is spaced from the polymeric material defining the first and eighth fold lines and forms a transverse gap therebetween along the second transverse edge defining a hinge pin receiving bore.

19. The method of forming a generally rectangular visible file pocket of the type having first and second transverse parallel edges and front and back, upper and lower pocket tips respectively defined by first, second, third and fourth turned-over edge portions formed integrally therewith and wherein the front and back lower pocket tips are adjacent the first transverse parallel edge and the front and back upper pocket tips are adjacent the second transverse parallel edge, comprising the steps of:
 (a) feeding first and second continuous sheets of coated polymeric materials each having a heat-bondable surface film formed thereon through a laminating station with the heat-bondable surface films thereon disposed in face-to-face relation;
 (b) separating the first and second continuous sheets adjacent their longitudinal edges as such sheets pass through the laminating station;
 (c) heating the first and second continuous sheets in the laminating station to soften the heat-bondable surface films thereon;
 (d) applying a heat-sealing effective pressure to the heated first and second continuous sheets in the laminating station over the central surface area of the sheets while maintaining the spaced longitudinal edges thereof in spaced apart relation so as to form a continuous laminated central web having front and back document receiving faces and longitudinally extending unlaminated, unbonded edges;
 (e) cooling the heated polymeric materials while the longitudinal edges of the first and second sheets are maintained in spaced apart relation;
 (f) feeding the continuous laminated central web through a series of edge forming stations wherein the unlaminated, unbonded plies of polymeric edge material defined by the first and second sheets are:
  (i) spread apart in diverging relation;
  (ii) edge heated to soften the polymeric material defining the spread unlaminated edges for permitting such material to be heat-set in a desired folded over configuration;
  (iii) folded in opposite directions along each longitudinal edge through angles on the order of 90° with respect to the laminated central web;
  (iv) folded through additional angles on the order of 90° with the folded over edge plies defined by the first and second sheets overlying and underlying the continuous laminated central web and defining front and back pocket tips along each of the longitudinal edges of the web; and, (v) cooled and set in the folded over configuration; and, (g) cutting the continuous laminated central web and its folded over edges to form a plurality of visible file pockets having front and back, continuous, uninterrupted pocket tips integral therewith and coextensive with first and second transverse parallel edges thereof for receiving and captively retaining documents inserted therein on either or both of the front and back faces of the laminated central web.

20. The method as set forth in claim 9 wherein the unlaminated, unbonded plies of polymeric edge material defined by the first and second sheets define left and right longitudinally extending T-shaped edges having the heat-bondable surface film formed thereon facing outwardly following Step (f)(iii); and, heat-bonding left and right ribbons of coated polymeric material having heat-bondable surface films formed thereon and disposed in face-to-face relation with the heat-bondable surface film of respective ones of the T-shaped edges to the T-shaped edges prior to Step (f)(iv).

21. The method as set forth in claim 20 wherein the left and right ribbons each have greater widths than respective ones of the left and right T-shaped edges so that upon completion of Step (f)(iv), the left and right ribbons which define the outer laminations of the folded over front and back pocket tips terminate in aligned edge-to-edge relation with the folded over T-shaped edges which define the inner lamination of the folded over pocket tips.

22. The method as set forth in claim 20 wherein at least one of the left and right ribbons is initially disposed in face-to-face relation with its associated T-shaped edge in edge-to-edge aligned relationship, with the ribbon being initially bowed outwardly from the respective T-shaped edge and defining a continuous longitudinally extending gap therebetween.

23. The method as set forth in claim 22 wherein the width differential between the ribbon and its associated T-shaped edge is sufficient that upon completion of Step (f)(iv), a continuous, longitudinally extending hinge pin receiving bore is defined by the longitudinally extending gap between the folded over ribbon and T-shaped edge.

24. The method as set forth in claims 22 or 23 wherein the ribbon applied to the other T-shaped edge following Step (f)(iii), and prior to Step (f)(iv), is aligned in edge-to-edge relation therewith and initially defines a second longitudinally extending gap therebetween; and, wherein air contained within the second longitudinally extending gap is expressed therefrom and such second gap is closed and eliminated during Step (f)(iv).

25. The method as set forth in claims 19, 20, 21, 22 or 23 wherein the front and back pocket tips formed along each of the longitudinal web edges in Step (f)(iv) are shaped prior to Step (f)(v) to form front and back pocket tips each having a teardrop shaped profile and terminating in longitudinally extending free edges flared slightly away from the continuous laminated central web.

26. The method as set forth in claim 24 wherein the front and back pocket tips formed along each of the longitudinal web edges in Step (f)(iv) are shaped prior to Step (f)(v) to form front and back pocket tips each having a teardrop shaped profile and terminating in longitudinally extending free edges flared slightly away from the continuous laminated central web.

27. The method as set forth in claim 25 wherein the teardrop shaped front and back pocket tips are flattened slightly during Step (f)(v).

28. The method as set forth in claims 22 or 23 wherein the ribbon applied to the other T-shaped edge following Step (f)(iii), and prior to Step (f)(iv), is aligned in edge-to-edge relation therewith and initially defines a second longitudinally extending gap therebetween; expressing air contained within the second longitudinally extending gap during Step (f)(iv) so as to close and eliminate such second gap; shaping the front and back pocket tips during Step (f)(iv) to form pocket tips having teardrop shaped profiles; and, flattening the teardrop shaped front and back pocket tips slightly during Step (f)(v).

* * * * *